US011705111B2

(12) United States Patent
Kumar et al.

(10) Patent No.: US 11,705,111 B2
(45) Date of Patent: Jul. 18, 2023

(54) METHODS AND SYSTEMS FOR PREDICTING NON-DEFAULT ACTIONS AGAINST UNSTRUCTURED UTTERANCES

(71) Applicant: Samsung Electronics Co., Ltd., Suwon-si (KR)

(72) Inventors: Anil Kumar, Noida (IN); Teena Salhotra, Noida (IN); Vinod Kumar Mishra, Noida (IN); Mohammad Azam, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/460,598

(22) Filed: Aug. 30, 2021

(65) Prior Publication Data
US 2022/0148580 A1 May 12, 2022

(30) Foreign Application Priority Data
Nov. 12, 2020 (IN) .............................. 202011049495

(51) Int. Cl.
*G10L 15/14* (2006.01)
*G10L 15/07* (2013.01)
(Continued)

(52) U.S. Cl.
CPC ............ *G10L 15/144* (2013.01); *G06F 18/22* (2023.01); *G06F 18/24137* (2023.01);
(Continued)

(58) Field of Classification Search
CPC ... G10L 15/144; G10L 15/063; G10L 15/075; G10L 15/083; G10L 15/183;
(Continued)

(56) References Cited

U.S. PATENT DOCUMENTS 7,103,553 B2    9/2006  Applebaum et al.
7,580,908 B1 *  8/2009  Horvitz ................... G06N 7/01
                                                        706/45
(Continued)

FOREIGN PATENT DOCUMENTS

DE   10 2017 209504 A1   12/2017
KR   10-2019-0129580 A   11/2019
RU          2542937 C2     2/2015

OTHER PUBLICATIONS

Indian Examination Report dated May 30, 2022, issued in Indian Application No. 202011049495.
(Continued)

*Primary Examiner* — Bhavesh M Mehta
*Assistant Examiner* — Philip H Lam
(74) *Attorney, Agent, or Firm* — Jefferson IP Law, LLP

(57) ABSTRACT

A method to adaptively predict non-default actions against unstructured utterances by an automated assistant operating in a computing-system is provided. The method includes extracting voice-features based on receiving an input utterance from at-least one speaker by an automatic speech recognition (ASR) device, identifying the input utterance as an unstructured utterance based on the extracted voice-features and a mapping between the input utterance with one or more default actions as drawn by the ASR, obtaining at least one probable action to be performed in response to the unstructured utterance through a dynamic bayesian network (DBN). The method further includes providing the at least one probable action obtained by the DBN to the speaker in an order of the posterior probability with respect to each action.

19 Claims, 15 Drawing Sheets

(51) Int. Cl.
*G10L 15/06* (2013.01)
*G10L 15/08* (2006.01)
*G10L 15/183* (2013.01)
*G06F 18/22* (2023.01)
*G06F 18/2413* (2023.01)
*G06N 7/01* (2023.01)

(52) U.S. Cl.
CPC .............. *G06N 7/01* (2023.01); *G10L 15/063* (2013.01); *G10L 15/075* (2013.01); *G10L 15/083* (2013.01); *G10L 15/183* (2013.01); *G10L 2015/0631* (2013.01); *G10L 2015/0635* (2013.01)

(58) Field of Classification Search
CPC ..... G10L 2015/0631; G10L 2015/0635; G10L 15/1822; G06F 18/22; G06F 18/24137; G06F 18/29; G06F 40/35; G06F 40/30; G06N 7/01; G06N 20/00
See application file for complete search history.

(56) References Cited

U.S. PATENT DOCUMENTS

| | | |
|---|---|---|
| 9,031,844 B2 | 5/2015 | Yu et al. |
| 9,858,925 B2 | 1/2018 | Gruber et al. |
| 10,446,141 B2 * | 10/2019 | Krishnamoorthy ..... G10L 15/02 |
| 10,521,466 B2 | 12/2019 | Bellegarda et al. |
| 10,741,178 B2 | 8/2020 | Jo et al. |
| 10,769,384 B2 | 9/2020 | Mars et al. |
| 10,810,274 B2 * | 10/2020 | Thomson ........... H04N 21/4826 |
| 10,957,308 B2 | 3/2021 | Kwon et al. |
| 2008/0312921 A1 | 12/2008 | Axelrod et al. |
| 2009/0030684 A1 | 1/2009 | Cerra et al. |
| 2014/0222426 A1 | 8/2014 | Di Fabbrizio et al. |
| 2015/0019217 A1 * | 1/2015 | Di Cristo .............. G06F 16/335 704/235 |
| 2019/0042988 A1 * | 2/2019 | Brown .................. G06N 5/022 |
| 2019/0348023 A1 | 11/2019 | Kwon et al. |
| 2020/0035244 A1 * | 1/2020 | Kim ........................ G06N 3/08 |
| 2020/0184959 A1 * | 6/2020 | Yasa .................... G10L 15/1815 |

OTHER PUBLICATIONS

International Search Report dated Dec. 27, 2021, issued in International Application No. PCT/KR2021/012524.

* cited by examiner

Metadata Table

| String | App Name/channel name | Content | duration |
|---|---|---|---|
| Serial 1 | Channel 1 | TV serial | 30 m |
| Serial 2 | Channel 2 | TV serial | 30 m |
| Serial 3 | Channel 3 | Cartoon show | 30 m |
| Serial 4 | OTT | App name | 1 h |
| Serial 5 | Movie channel | movie | 2 h |
| Serial 6 | Sporta channel | Sports related news | 2 h |
| ...... | | | ...... |

METHODS AND SYSTEMS FOR PREDICTING NON-DEFAULT ACTIONS AGAINST UNSTRUCTURED UTTERANCES

CROSS-REFERENCE TO RELATED APPLICATION(S)

This application is based on and claims priority under 35 U.S.C. § 119(a) of an Indian patent application number 202011049495, filed on Nov. 12, 2020, in the Indian Patent Office, the disclosure of which is incorporated by reference herein in its entirety.

BACKGROUND

1. Field

The disclosure relates to predicting non-default actions. More particularly, the disclosure relates to predicting non-default actions against unstructured utterances through machine learning/deep learning criteria.

2. Description of Related Art

Virtual personal assistance (VPA) based devices understand voice-commands and thereby trigger the occurrence of various tasks for a user, e.g., showing the map to a destination, rendering the latest news, switching on devices, rendering search results for a topic, or the like. The devices may render final output acoustically or through a display or a combination of both. Action for any utterance may be a two-step process, a) getting speech-recognition for the given utterance, and b) resolving the probable action for the given command/utterance from an action resolver which contains skills/capsules. Accordingly, voice assistants respond to user-commands according to the capsule/skills/utterances for which they have been trained.

Voice assistants are trained with structured utterances having action, title/subject and entities (custom or fixed). As a result, voice assistants do not perform user intended actions for unstructured utterances.

Traditionally, when a user speaks unstructured utterances against like "raptors", "XYZ Fights", "health track record", "Yoga postures", or the like, the response from a voice assistant/bot is with a default action and most of the time, the response is "I didn't understand" or "unable to perform actions" or "I am afraid I can't take any action" or "I am still learning" or display search results from a search website or any similar response.

Unstructured utterances are sometimes common across the globe and sometimes it is different for different people, hence no generalization is possible prior to development. Many of the time, a user provides unstructured utterances for which assistants provide a default action (i.e., I do not understand, search result, or the like). As a result, it degrades the user experience for novice users.

One solution can be to ask a user on devices to select the actions based on utterances in a real-environment to train/re-train and deploy the model. However, a centralized collection of individual actions raises major privacy concerns. In addition, re-listing if utterances are required by each user on the model update for new utterances and its respective actions.

In other instances, existing systems adopt merely acoustic-features into consideration and usually perform according to the previous utterances/behavior of the user. For a novice-assistant user, it will be a bad experience if the system merely provides a single default action/response for unstructured utterances.

In yet another instance, existing systems merely consider a behavior of the user into account while performing appropriate action/response of utterances. For many of the cases, general users of a particular area/region requires some similar tasks to be performed on many of the utterances. For example, the utterance may be 'ZYZ Fights' and the existing action/response may be any of 'I do not understand' or shows 'YouTube search results'.

Accordingly, there is a need for a method to adaptively predict non-default actions against unstructured utterances by an automated assistant operating in a computing-system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system to adaptively predict non-default actions against unstructured utterances by an automated assistant operating in a computing-system.

Additional aspects will be set forth in part in the description which follows and, in part, will be apparent from the description, or may be learned by practice of the presented embodiments.

In accordance with an aspect of the disclosure, a method to adaptively predict non-default actions against unstructured utterances by an automated assistant operating in a computing-system is provided. The method includes extracting voice-features based on receiving an input utterance from at-least one speaker by an automatic speech recognition (ASR) device, determining the input utterance as an unstructured utterance based on the extracted voice-features and a mapping between the input utterances with one or more default actions as drawn by the ASR, and computing one or more probable actions to be performed in response to the unstructured utterance through a dynamic bayesian network (DBN). Further, the computing includes accessing a log of previous unstructured utterances and the input utterance from the dynamic bayesian network, each of the utterance defined by a context parameter, calculating a centroid, and a similarity parameter for each of the previous unstructured utterance and the input utterance and based thereupon determining a set of similar utterance similar to the input utterance and predicting a plurality of probable actions linked to one or more of the input utterance and the set of similar utterances based on posterior probability computation for each probable action. The method further includes recommending one or more probable actions computed from the dynamic bayesian network to the speaker in an order of the posterior probability with respect to each action.

In accordance with another aspect of the disclosure, an automated assistant operating in a computing-system to adaptively predict non-default actions against unstructured utterances is provided. The automated assistant includes an ASR device configured to extract voice-features based on receiving an input utterance from at-least one speaker, an action resolver configured to determine the input utterance as an unstructured utterance based on the extracted voice-features and a mapping between the input utterances with one or more default actions as drawn by the ASR, a DBN configured to compute one or more probable actions to be performed in response to the unstructured utterance. The computing includes accessing a log of previous unstructured utterances and the input utterance from the dynamic bayesian network, each of the utterance defined by a context parameter. The computing includes calculating a centroid, and a similarity parameter for each of the previous unstructured utterance and the input utterance and based thereupon determining a set of similar utterance similar to the input utterance. The computing further includes predicting a plurality of probable actions linked to one or more of the input utterance and the set of similar utterances based on posterior probability computation for each probable action. The automated assistant includes a voice engine for recommending one or more probable actions computed from the dynamic bayesian network to the speaker in an order of the posterior probability with respect to each action.

At least by virtue of aforesaid, the subject matter provides context based automatic similarity of user utterances. User unstructured utterances are detected and a similarity to previously used utterances is evaluated. Based on confidence using a predefined threshold value, a result is displayed to user.

Specifically, as a part of re-informant learning, device will identify the user actions with respect to context and utterances in that context, usage patterns, user actions or the like, and label of utterance in response to manual rejection of actions performed by model.

Further, a posterior probability of possible actions of global model with possible actions with given unstructured utterances calculate the probability & take default actions. As a part of retraining of the dynamic bayesian network, a new model is generated with new possible actions for utterances.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or system that comprises a list of steps does not include only those steps but may include other steps not expressly listed or inherent to such process or system. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, systems, and examples provided herein are illustrative only and not intended to be limiting.

Embodiments of the subject matter are described below with reference to the accompanying drawings.

Figure 1:
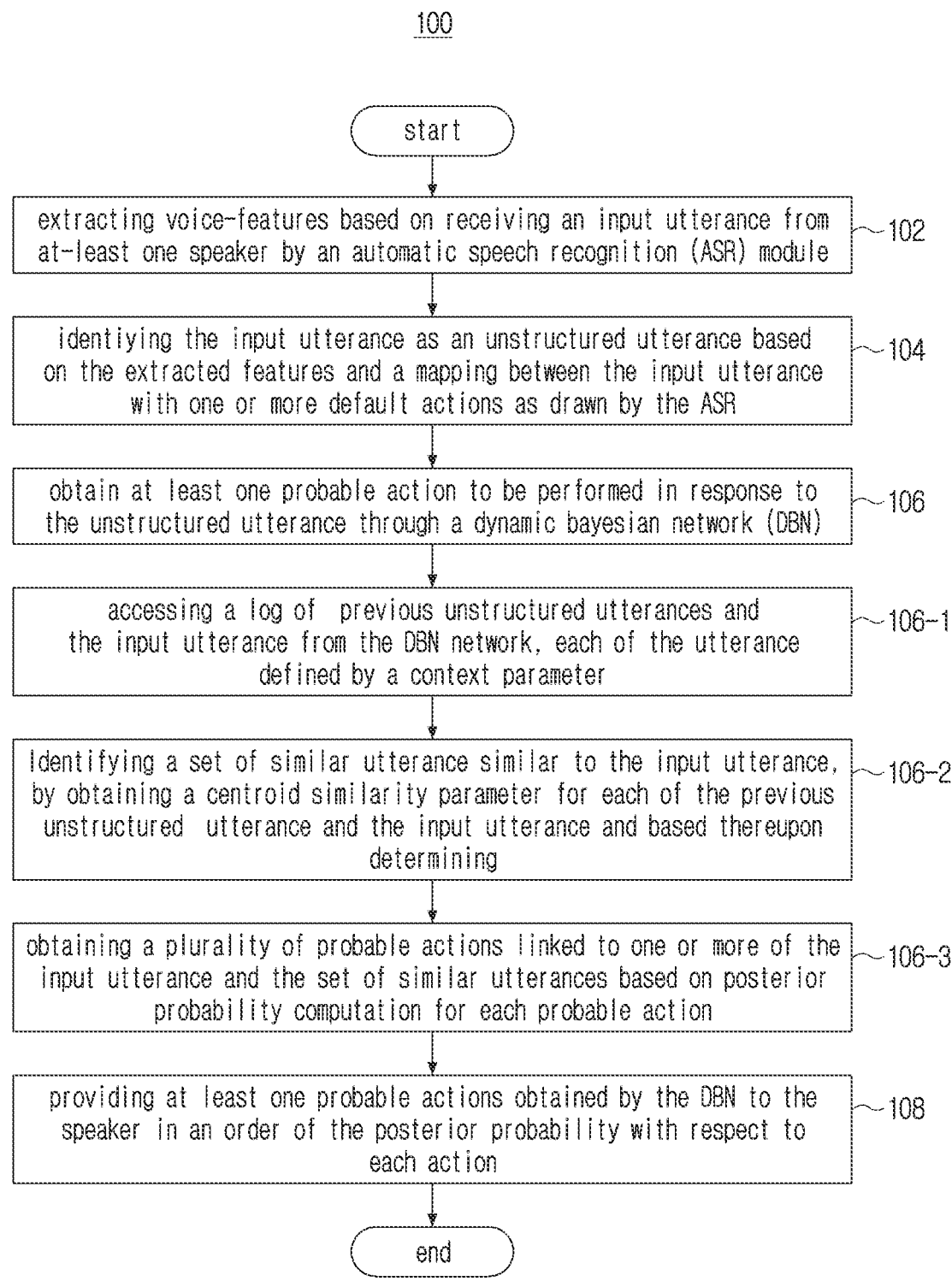
FIG. 1 illustrates a flow diagram depicting a method to adaptively predict one or more non-default actions against one or more unstructured utterances, according to an embodiment of the disclosure.

FIG. 1 illustrates a flow diagram of a method 100 to adaptively predict non-default actions against unstructured utterances according to an embodiment of the disclosure.

Referring to FIG. 1, the method 100 may be performed in a dynamic bayesian network employing a computing system. The method 100 may utilize any of machine learning, and deep learning criteria.

In accordance with an embodiment of the disclosure, the method 100 includes extracting (operation 102) voice-features based on receiving an input utterance from at-least one speaker by an automatic speech recognition (ASR) module.

Further, the method 100 includes identifying (determining) (operation 104) the input utterance as an unstructured utterance based on the extracted features and a mapping between the input utterance with one or more default actions as drawn by the ASR.

Continuing with above embodiment of the disclosure, the method 100 includes obtaining (computing) (operation 106) at least one (one or more) probable action(s) to be performed in response to the unstructured utterance through a Dynamic Bayesian Network.

Further, the obtaining (computing) includes, accessing (operation 106-1) a log of previous unstructured utterances and the input utterance from the dynamic bayesian network, each of the utterance defined by a context parameter.

Upon accessing the log, the obtaining (computing) further includes, identifying (operation 106-2) a set of similar utterance similar to the input utterance, by obtaining a centroid and a similarity parameter for each of the previous unstructured utterance and the input utterance.

Continuing with the above embodiment of the disclosure, the obtaining (computing) also includes, obtaining (operation 106-3) a plurality of probable actions linked to one or more of the input utterance and the set of similar utterances based on posterior probability computation for each probable action.

Further, upon computing, the method 100 includes providing (recommending) (operation 108) at least one (one or more) probable action(s) computed from the dynamic bayesian network to the speaker in an order of the posterior probability with respect to each action.

In an embodiment of the disclosure, wherein the identifying of the input utterance as an unstructured utterance based on the extracted features comprises identifying absence of a regular-action in response to the input utterance from an action resolver module forming a part of the ASR module, and identifying the default-action as being mapped with the input utterance from the action resolver module.

In an embodiment of the disclosure, wherein the log of the unstructured utterance comprises a plurality of parameters for the unstructured utterance as at least one of the context, centroid similarity, or predicted action, wherein the predicted action is obtained by the unstructured utterance as the posterior probability based on the context and centroid similarity associated with the utterance.

In an embodiment of the disclosure, wherein the obtaining of the plurality of probable actions comprises obtaining the posterior probability for the predicted action based on the context and the centroid similarity associated with the set of similar utterances and the input utterance.

In an embodiment of the disclosure, the method further comprising accessing pre-stored action-utterance pairs in a local database of a device associated with the speaker, obtaining a semantic similarity between the plurality of probable-actions computed from the dynamic bayesian network and the pre-stored action-utterance pairs from the local database, and shortlisting one or more actions with a high confidence score based on the semantic similarity for facilitating the recommending of at least one probable action to the speaker, the at least one probable action substituting the default actions responded by the ASR.

In an embodiment of the disclosure, the method further comprising receiving a review of the recommended at least one probable action from the speaker of the input utterance, registering the input utterance with associated context into the local database of the device based on a positive-feedback received as a part of the review from the speaker, and linking the one or more probable action with the input utterance within the local database based on the positive feedback.

In an embodiment of the disclosure, the method further comprising receiving a negative feedback towards the recommended at least one probable action in response to the input-utterance from the speaker during the reviewing, wherein the negative feedback corresponding to rejection of all of the recommended actions by the speaker and rejection of high recommended actions followed by acceptance of less recommended action by the speaker, and updating a global model associated with the dynamic bayesian network based on the negative feedback.

In an embodiment of the disclosure, wherein the updating of the global model further comprises obtaining a posterior probability in respect of a non-performance of the recommended action against the unstructured-utterance and comparing the posterior probability related to the non-performance with a first pre-defined threshold of the dynamic bayesian network, based on the posterior probability exceeding the pre-defined threshold, initiating training of a global model, and retraining the global model at least based on the input utterance and the associated context and instantiating the trained global model with respect to the device.

In an embodiment of the disclosure, wherein the instantiating of the trained global model comprises obtaining a delta by identifying at least one predicted actions from the dynamic bayesian network upon updating of the global model, wherein the delta defining a difference between predicted actions by the dynamic bayesian network before and after the global update, deleting historical data related to action-utterance from the local database and storing the delta, and re-generating a set of utterances-action for the local database based on the updated global model.

In an embodiment of the disclosure, wherein the initiating of the training of the global model comprises initiating the training based on determining at-least one of identifying, if the computed semantic similarity between the one or more probable actions predicted from the dynamic bayesian network and action-utterance pairs in the local exceeds a second pre-defined threshold associated with the dynamic bayesian network, and identifying, if the probabilities associated with the one or more probable actions recommended to the speaker differ by minimal extent.

In an embodiment of the disclosure, wherein the retraining of the global model comprises registering the input utterance within the global model by aggregating the input utterance by a semantic similarity aggregator into a repository of global utterances to, the semantic similarity aggregator configured to aggregate utterances globally at-least based on the context.

In an embodiment of the disclosure, wherein the updating further comprises updating a control setting of the device in respect of further processing of input utterances.

In an embodiment of the disclosure, wherein the identifying of the input utterance as an unstructured utterance comprises identifying an action associated with the text by processing the text by the action resolver module, allocating the default action to the input utterance by classifying the input utterance as the unstructured utterance by the action resolver module based on an inability to locate the regular action related to the input utterance, and obtaining the input utterance to the dynamic bayesian network for determining the one or more probable actions for substituting the default action by identifying the determined action as the default action by an action-checker module.

Figure 2:
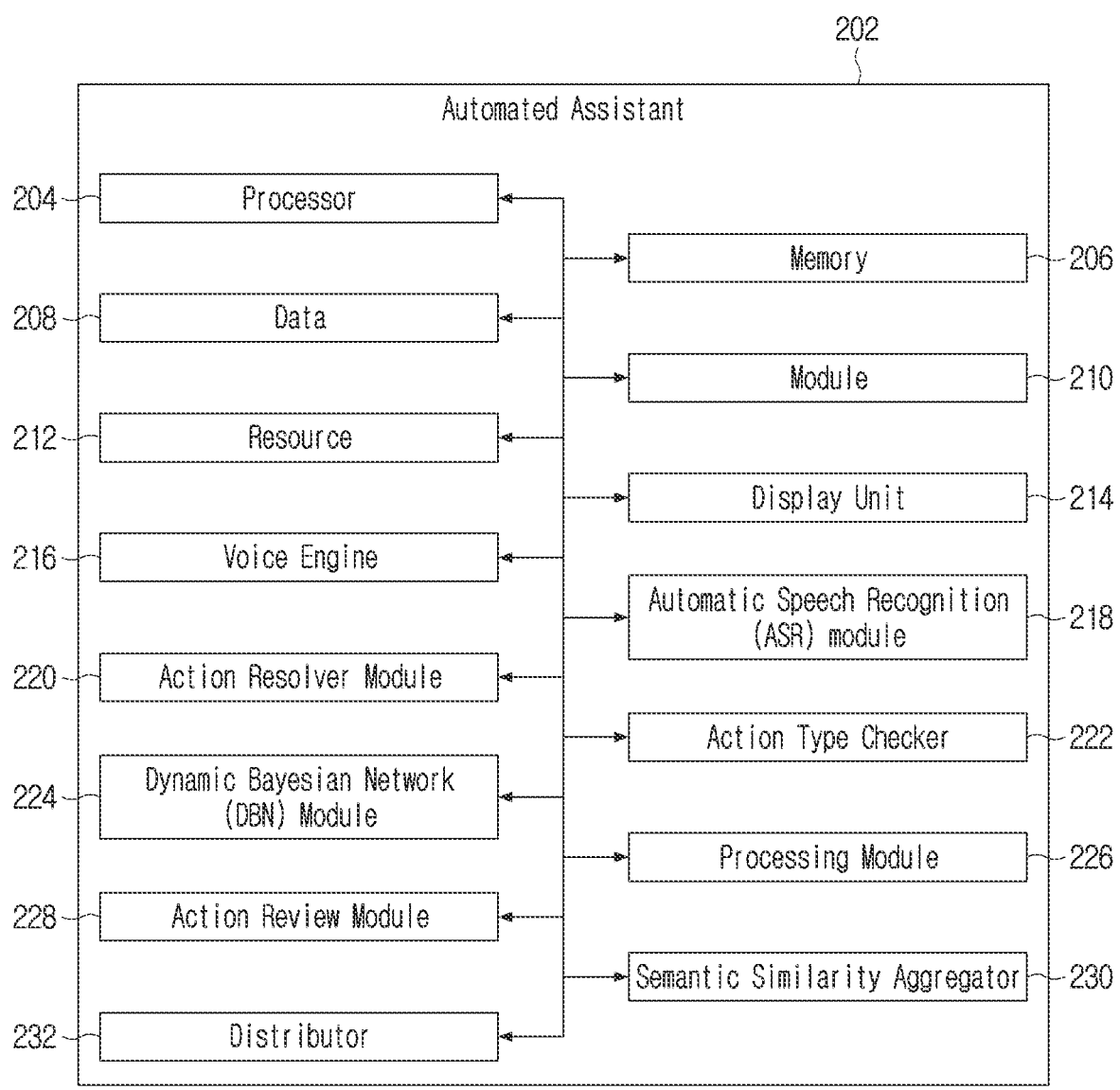
FIG. 2 illustrates a schematic block diagram of an automated assistant to adaptively predict one or more non-default actions against one or more unstructured utterances, according to an embodiment of the disclosure.

FIG. 2 illustrates a schematic block diagram 200 of an automated assistant 202 to adaptively predict one or more non-default actions against unstructured utterances according to an embodiment of the disclosure.

Referring to FIG. 2, in an embodiment of the disclosure, the automated assistant 202 may be incorporated in a device. Examples of the device may include, but are not limited to a laptop, a tab, a smart phone, a personal computer (PC). In an embodiment of the disclosure, the non-default actions may be predicted by the automated assistant 202 for performing upon receiving one or more unstructured utterances from a user. In an embodiment of the disclosure, the one or more unstructured utterances may be a group of words directing the automated assistant 202 to perform one or more actions. In an embodiment of the disclosure, the user may also be referred as at least one speaker as referred in FIG. 1. Examples of the one or more actions may include, but are not limited to, browsing the Internet, making a call, sending a text message, playing music, playing video or the like Further in an embodiment of the disclosure, the automated assistant 202 may be configured to employ a Dynamic Bayesian Network for predicting the non-default actions. The automated assistant 202 includes a processor 204, a memory 206, data 208, module (s) 210, resource (s) 212, a display unit 214, a voice engine 216, an ASR module 218, an action resolver module 220, an action type checker 222, a dynamic bayesian network module 224, a processing module 226, an action review module 228, a semantic similarity aggregator 230, and a distributor 232. In an embodiment of the disclosure, the voice engine 216, the ASR module 218, the action resolver module 220, the action type checker 222, the dynamic bayesian network module 224, and the processing module 226, the action review module 228, the semantic similarity aggregator 230, the, and the distributor 232 may be communicatively coupled to one another.

At least one of the plurality of modules may be implemented through an AI model. A function associated with AI may be performed through the non-volatile memory or the volatile memory, and/or the processor.

The processor may include one or a plurality of processors. At this time, one or a plurality of processors may be a general purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

A plurality of processors control the processing of the input data in accordance with a predefined operating rule or artificial intelligence (AI) model stored in the non-volatile memory or the volatile memory. The predefined operating rule or artificial intelligence model is provided through training or learning. Here, being provided through learning means that, by applying a learning technique to a plurality of learning data, a predefined operating rule or AI model of a desired characteristic is made. The learning may be performed in a device itself in which AI according to an embodiment is performed, and/or may be implemented through a separate server/system. The AI model may consist of a plurality of neural network layers. Each layer has a plurality of weight values, and performs a layer operation through calculation of a previous layer and an operation of a plurality of weights. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), a generative adversarial networks (GAN), and a deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the subject matter, in a method of an electronic device, a method to adaptively predict non-default actions against unstructured utterances may receive a speech signal, which is an analog signal, via (e.g., a microphone) and convert the speech part into computer readable text using an ASR model. The user's intent of utterance may be obtained by interpreting the converted text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Language understanding is a technique for recognizing and applying/processing human language/text and includes, e.g., natural language processing, machine translation, dialog system, question answering, or speech recognition/synthesis.

As would be appreciated, the automated assistant 202, may be understood as one or more of a hardware, a software, a logic-based program, a configurable hardware, and the like. In an example, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data stored in the memory 206.

In an example, the memory 206 may include any non-transitory computer-readable medium known in the art including, for example, a volatile memory, such as a static random access memory (SRAM) and/or a dynamic random access memory (DRAM), and/or a non-volatile memory, such as a read-only memory (ROM), an erasable programmable ROM (EPROM), a flash memory, hard disks, optical disks, and/or magnetic tapes. The memory 206 may include the data 208. The data 208 serves, amongst other things, as a repository for storing data processed, received, and generated by one or more of the processor 204, the module(s) 210, the resource(s) 212, the display unit 214, the voice engine 216, the ASR module 218, the action resolver module 220, the action type checker 222, the dynamic bayesian network module 224, and the processing module 226, the action review module 228, the semantic similarity aggregator 230, and the distributor 232.

The module(s) 210, amongst other things, may include routines, programs, objects, components, data structures, or the like, which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the disclosure, the module(s) 210 may be machine-readable instructions (software) which, when executed by a processor/processing unit, may perform any of the described functionalities.

In embodiments of the disclosure, the module(s) 210 may be machine-readable instructions (software) which, when executed by a processor 204/processing unit, perform any of the described functionalities.

The resource(s) 212 may be physical and/or virtual components of the automated assistant 202 that provide inherent capabilities and/or contribute towards the performance of the automated assistant 202. Examples of the resource(s) 212 may include, but are not limited to, a memory (e.g., the memory 206), a power unit (e.g., a battery), a display unit (e.g., the display unit 214) or the like. The resource(s) 212 may include a power unit/battery unit, a network unit, or the like, in addition to the processor 204, and the memory 206.

The display unit 214 may display various types of information (for example, media contents, multimedia data, text data, or the like) to the automated assistant 202. The display unit 214 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the voice engine 216, the ASR module 218, the action resolver module 220, the action type checker 222, the dynamic bayesian network module 224, and the processing module 226, the action review module 228, the semantic similarity aggregator 230, and the distributor 232, amongst other things, include routines, programs, objects, components, data structures, or the like, which perform particular tasks or implement data types. The voice engine 216, the ASR module 218, the action resolver module 220, the action type checker 222, the dynamic bayesian network module 224, and the processing module 226, the action review module 228, the semantic similarity aggregator 230, and the distributor 232 may also be implemented as, signal processor(s), state machine(s), logic circuitries, and/or any other device or component that manipulate signals based on operational instructions. Further, the voice engine 216, the ASR module 218, the action resolver module 220, the action type checker 222, the dynamic bayesian network module 224, and the processing module 226, the action review module 228, and the semantic similarity aggregator 230 can be implemented in hardware, instructions executed by a processing unit, or by a combination thereof. The processing unit can comprise a computer, a processor, such as the processor 204, a state machine, a logic array or any other suitable devices capable of processing instructions. The processing unit can be a general-purpose processor which executes instructions to cause the general-purpose processor to perform the required tasks or, the processing unit can be dedicated to perform the required functions.

According to an embodiment of the subject matter, the voice engine 216 may be configured to communicate with the user and receive the one or more input utterances from the user. In an embodiment of the disclosure, the voice engine 216 may be configured to act as an interface between the user and the other modules incorporated in the automated assistant 202. Accordingly, the voice engine 216 may be based on an Artificial Intelligence (AI) technique. In an embodiment of the disclosure, the voice engine 216 may be configured to send the one or more input utterances to the ASR module 218 for further processing. In an embodiment of the disclosure, the one or more input utterances may be also referred as an audio speech, and the voice stream.

In an embodiment of the disclosure, the voice engine 216 may be an interface between the user and a number of modules incorporated within the automated assistant 202. In an embodiment of the disclosure, the voice engine 216 may be configured to establish communication channel between servers and the device and the number of modules within the device. The voice engine 216 may utilize GRPC and a number of protocols, such as message queuing telemetry transport (MQTT) to act as a bridge between the number of modules.

In an embodiment of the disclosure, the ASR module 218 may also be referred as ASR server incorporated in the automated assistant 202. In an embodiment of the disclosure, the ASR module 218 may be configured to receive the one or more input utterances from the voice engine 216. In an embodiment of the disclosure, ASR module 218 may be an AI module configured to receive the audio stream and convert the audio stream into text upon processing using a number of ASR modules deployed on the server. In an embodiment of the disclosure, the audio stream may be referred as the one or more input utterances referred in FIG. 1. Furthermore, the ASR modules may be trained on large dataset. In an embodiment of the disclosure, the ASR module 218 may be based on 'directed dialogue conversation' and 'Natural language conversations'. In an embodiment of the disclosure, performance of the ASR module 218 may impact the automated system 202 and the language model may play a key role in generating the impact. In an embodiment of the disclosure, the ASR module 218 may perform audio cleaning upon the audio stream. In an embodiment of the disclosure, the audio cleaning may perform removal of a background noise from the audio stream. Upon removal of the audio stream, the ASR module 218 may be configured to extract a number of voice-features from the one or more input utterances by employing natural language understanding (NLU) technique. The ASR module 218 may be configured to convert the one or more input utterances into a text based on the NLU. To that understanding, the ASR module 218 may be further configured to communicate with the action resolver module 220 for transmitting the text associated with the one or more input utterances.

Continuing with the above embodiment of the disclosure, the action resolver module 220 may also be referred as an action assistant resolver. Further, the action resolver module 220 may be based on a server associated with one or more of the automated assistant 202, a time capsule, and a server related to skills. In an embodiment of the disclosure, the action resolver module 220 may be based on natural language processing (NLP), natural language understanding (NLU), and natural language generation (NLG). Using the NLP, the NLU, and the NLG on the one or more unstructured utterances, an intent associated with the one or more unstructured utterances may be identified. Upon identifying the intent, the action resolver module 220 may be configured to extract a number of slots and an entity based on an intent entity. Furthermore, based on the number of slots and the entity, the action resolver module 220 may be configured to identify the one or more actions to be fired.

In an embodiment of the disclosure, the action resolver module 220 configured to process the text generated at the ASR module 218 for determining the one or more actions based on the one or more input utterances. Furthermore, the action resolver module 220 may be configured to ascertain whether the one or more input utterances received at the voice engine 216 may be considered as the one or more unstructured utterances or not. In an embodiment of the disclosure, the one or more unstructured utterances may also be determining the one or more actions. Further, the determination may be based on the text and a mapping between the one or more input utterances with one or more default actions as drawn by the ASR module 218. For determining the one or more input utterances as the one or more unstructured utterances, the action resolver module 220 may be configured to determine whether a regular-action amongst the one or more actions in response to the one or more input utterances is or not. Further, the action resolver module 220 may be configured to determine the one or more default actions as being mapped with the one or more input utterances from the action resolver module 220. Furthermore, the action resolver module 220 may be configured to transmit the one or more actions in the form of a response to the voice engine 216. In an embodiment of the disclosure, the voice engine 216 may receive the response using the MQTT or any such protocol. Furthermore, the voice engine 216 may be configured to communicate with the action type checker 222 for transmitting the one or more actions.

Continuing with the above embodiment of the disclosure, the action type checker 222 may be configured to receive the one or more actions from the voice engine 216. Upon receiving the one or more actions, the action type checker 222 may be configured to classify the one or more actions into any of one or more default actions, and one or more non-default actions. Upon determining that the one or more actions may be categorized as the one or more non-default action, the action type checker 222 may be configured to transmit the one or more actions to the voice engine 216 for further recommending the one or more actions in response to the one or more unstructured utterances received by the user. In an embodiment of the disclosure, the action type checker 222 may be configured to transmit the one or more actions to the dynamic bayesian network module 224 upon determining that the one or more actions may be categorized as the one or more default actions for further processing.

Further, the dynamic bayesian network module 224 may be configured to compute one or more probable actions to be performed in response to the one or more unstructured utterances from the one or more actions. Furthermore, computing the one or more probable actions may be based on an additional node type based on one or more node types extracted as an input from the action type checker 222. In an embodiment of the disclosure, the one or more actions may be referred as the one or more node types. In an embodiment of the disclosure, the one or more node types and the additional node type may include the one or more unstructured utterances, the one or more action and a context. Furthermore, the method includes calculating a centroid associated with the number of previous utterances and the one or more unstructured utterances. Each of the number of previous utterances and the one or more unstructured utterances may be accessed for calculating the centroid. In an embodiment of the disclosure, the centroid may be calculated by the dynamic bayesian network module 224.

Accordingly, the processing module 226 may be configured to access a number of pre-stored action-utterance pairs in a local database of the device associated with the at least one speaker. Upon accessing the local database, the processing module 226 may be configured to compute a semantic similarity between the one or more probable actions and the number of pre-stored action utterance pairs from the local database. Moving forward, the processing module 226 may be configured to shortlist the one or more probable actions with a high confidence score based on a high semantic similarity for facilitating the recommending of the one or more probable actions to the at least one speaker via the voice engine 216, such that the one or more probable actions may be substituting the one or more default actions responded by the action resolver module 220.

Further, the voice engine 216 may be configured to recommend the one or more probable actions to the at least one speaker. In an embodiment of the disclosure, the one or more probable actions may be recommended in an order based on the confidence score. In an embodiment of the disclosure, an action amongst the one or more probable actions with a highest confidence score as calculated above by the processing module 226 may be recommended at a top position and further be followed by other actions amongst the one or more probable actions with the confidence scores lesser than the action recommended above.

To that understanding, the action review module 228 may be configured to determine a review for the one or more probable actions determined upon performing of the one or more probable actions. In an embodiment of the disclosure, the review may be based on a selection of the one or more probable actions by the at least one speaker upon being presented with the one or more probable actions by the voice engine 216. In an embodiment of the disclosure, the review may be categorized into a positive feedback, and a negative feedback. In an embodiment of the disclosure, the action review module 228 may be configured to categorize the review as the positive feedback upon determining the at least one speaker selected the action at the top position. Similarly, the action review module 228 may be configured to categorize the review as the negative feedback based on a determination that the at least one speaker selected other actions with the confidence score lesser than the action at the top position.

Further, the action review module 228 may be configured to register the one or more unstructured utterances with an associated context into the local database of the device based on the positive-feedback. In an embodiment of the disclosure, the action review module 228 may be configured to associate the one or more probable actions with the one or more unstructured utterances within the local database based on the positive feedback.

In continuation with the above embodiment of the disclosure, for the negative feedback, the action review module 228 may be configured to reject the one or more probable actions recommended by the at least one speaker. Furthermore, the action review module 228 may be configured to reject a high recommended one or more probable actions and accept a less recommended one or more probable actions by the at least one speaker. In an embodiment of the disclosure, the high recommended one or more probable actions may be the action at the top position recommended to the at least one speaker. Further, the action review module 228 may be configured to update a global model associated with the dynamic bayesian network module 224 based on the receipt of the negative feedback. In an embodiment of the disclosure, updating the global model may be based on computing a posterior probability for the one or more probable actions upon receiving the negative feedback by the action review module 228. Further, the action review module 228 may be configured to initiate training of the global model and instantiating the trained global model with respect to the device. Further, the action review module 228 is further configured for updating control-setting of the device in respect of further processing of the one or more input utterances.

Moving forward, the semantic similarity aggregator 230 may be configured to train the global model by aggregating the one or more unstructured utterances into a repository of the global utterances to register the one or more unstructured utterances within the global model. The semantic similarity aggregator 230 may be configured to aggregate the one or more unstructured utterances globally at-least based on the context. In an embodiment of the disclosure, the semantic similarity aggregator 230 may be configured to store a number of words and meaning associated with each word, further, the meaning may change based on a region of globe and the context. The semantic similarity aggregator 230 may be responsible to calculate the semantic similarity based on a region and the context related to the region impacting the action inferencing for the one or more unstructured utterances.

In an embodiment of the disclosure, a distributor 232 may be configured for deploying the global model over a cloud infrastructure.

Figure 3A:
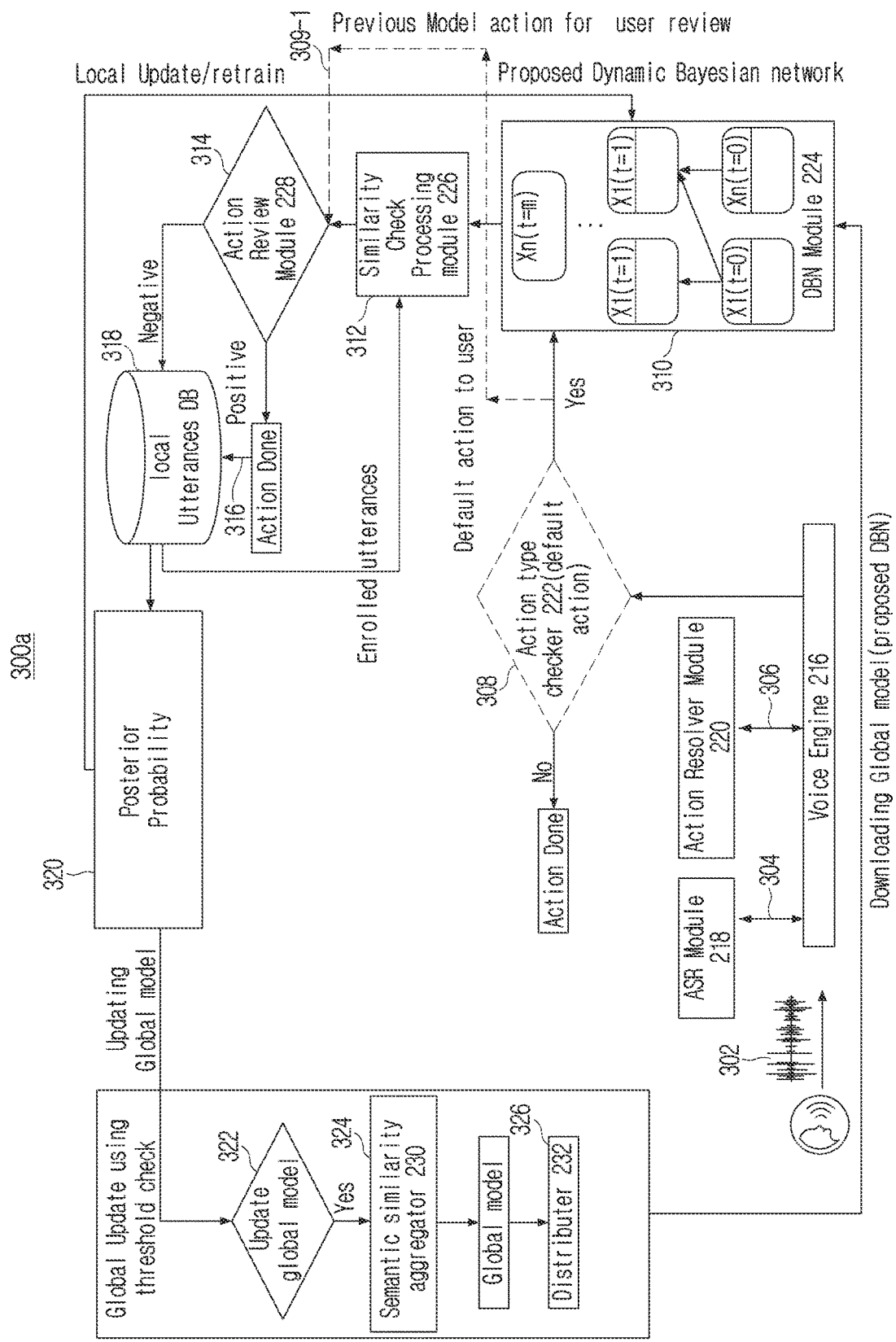
FIG. 3A illustrates an operational flow diagram depicting a method to adaptively predict one or more non-default actions against one or more unstructured utterances, according to an embodiment of the disclosure.

FIG. 3A illustrates an operational flow diagram 300a depicting a method to adaptively predict one or more non-default actions against one or more input utterances according to an embodiment of the disclosure.

Referring to FIG. 3A, in an embodiment of the disclosure, predicting the one or more non-default actions may be performed in a dynamic bayesian network environment. In an embodiment of the disclosure, the one or more non-default actions may be predicted based on one or more input utterances received from at least one speaker at a device. In an embodiment of the disclosure, the at least one speaker may be referred as a user as referred in FIG. 1 and FIG. 2. In an embodiment of the disclosure, the method may be executed by the automated assistant 202 incorporated within the device and the components thereof referred in FIG. 2.

At operation 302, the method includes a communication between the user and the automated assistant 202 upon receiving the one or more input utterances uttered by the user at the voice engine 216.

At operation 304, the method includes extracting a number of user voice features and determining the most appropriate action for the utterance also referred as the one or more input utterances in FIGS. 1 and 2. In an embodiment of the disclosure, the number of user voice features may be referred as a number of voice features referred in FIG. 2. Further, the most appropriate action may be referred as one or more probable actions referred in FIG. 2. In an embodiment of the disclosure, the method includes a communication between the voice engine 216 and the ASR server such that the ASR server may receive the one or more input utterances from the voice engine 216. In an embodiment of the disclosure, the ASR server may be interchangeably referred as the ASR module 218 referred in FIGS. 1 and 2. In an embodiment of the disclosure, the method includes converting one or more input utterances into a text through upon employing at least one AI technique through the ASR module 218. In an embodiment of the disclosure, the method includes performing an audio cleaning upon the one or more input utterances such that the audio cleaning may lead to removal of a background noise from the one or more input utterances. Furthermore, the method includes extracting the number of voice-features from the one or more input utterances through the at least one AI technique. As moving forward, the method includes sending the text from the ASR module 218 to the voice engine 216 upon processing the one or more input utterances.

At operation 306, the method includes, transmitting the text from the voice engine 216 to the action resolver module 220. Upon receiving the text at the action resolver module 220, the method includes determining one or more actions related to the text. Further, the method includes classifying the one or more input utterances as the one or more unstructured utterances upon being unable to locate a regular action in response to the one or more input utterances. Further, the method includes, ascertaining that one or more default actions are mapped with the one or more unstructured utterances. Further, the method includes transmitting the one or more actions from the action resolver module 220 to the voice engine 216.

Continuing with the above embodiment of the disclosure, at operation 308, the method includes receiving the one or more actions fired from the action resolver module 220 at the voice engine 216. Moving forward, the method includes transmitting the one or more actions to the action type checker 222 referred in FIG. 2. In an embodiment of the disclosure, the method includes classifying the one or more actions through the action type checker 222 into at least one category. In an embodiment of the disclosure, the at least one category may be any of one or more default actions and the one or more non-default actions.

In an embodiment of the disclosure, where it is determined that one or more actions may correspond to default actions also referred as the one or more default actions, the method proceeds towards operation 310 for determining the most probable action by the dynamic bayesian network module 224. In an embodiment of the disclosure, the most probable actions may be referred as the one or more probable actions. Further, in an embodiment of the disclosure, where it is determined that the one or more actions may correspond to the one or more non-default actions, the one or more actions may be recommended via the voice engine 216 on the device.

At operation 310, the method includes receiving the one or more actions at the dynamic bayesian network module 224 for determining the one or more probable actions amongst the one or more actions. In an embodiment of the disclosure, the dynamic bayesian network module 224 may be configured to determine the one or more probable actions based on an additional type and calculating a centroid for the one or more unstructured utterances with a local database for other unstructured utterances. In an embodiment of the disclosure, the other unstructured utterances may be referred as a number of previous unstructured utterances. In an embodiment of the disclosure, the method includes accessing a log of the number of previous unstructured utterances and the one or more unstructured utterances from the dynamic bayesian network module 224. Further, each of the number of previous utterances may be defined by a context parameter. In an embodiment of the disclosure, the log of the number of previous unstructured utterances may correspond to a continuous probability table of the dynamic bayesian network module 224. Furthermore, the log may include a number of parameters for the number of previous unstructured utterances. In an embodiment of the disclosure, the number of parameters may include a context, a centroid, and one or more probable actions, such that the one or more probable actions having been computed for the one or more unstructured utterances as the posterior probability based on the context and the centroid associated with the one or more unstructured utterances. In an embodiment of the disclosure, the centroid may be determined upon calculating the centroid for the one or more unstructured utterances. In an embodiment of the disclosure, the method includes calculating the centroid for each of the number of previous unstructured utterances and the one or more unstructured utterances for determining a set of similar utterances similar to the one or more unstructured utterances. Upon calculating the centroid, the method includes determining the one or more probable actions. Continuing with the above embodiment of the disclosure, the method may move forward to operation 312. In an embodiment of the disclosure, an output of the dynamic bayesian network module 224 may be passed to check similarity of current user utterance also referred as the one or more unstructured references.

At operation 312, the method includes comparing the action specified by dynamic bayesian network module 224 with a number of action-utterance pairs in the database based on a semantic similarity with the utterance and action data in the local database. Further, a most appropriate action to be taken may be determined. In an embodiment of the disclosure, the method includes providing an output having least cosine distance from the one or more unstructured utterances. In an embodiment of the disclosure, the action specified by the dynamic bayesian network module 224 may be referred as the one or more probable actions. In an embodiment of the disclosure, comparison may be performed upon calculating the semantic similarity score between the one or more probable actions and the number of pre-stored action utterance pairs also referred as the utterance and action data. In an embodiment of the disclosure, the number of pre-stored action utterance pairs may be stored in the local database within the device. In an embodiment of the disclosure, the comparison may be performed by the processing module 226.

Upon calculating the semantic similarity score, the method includes determining one or more shortlisted actions from the one or more probable actions with a high confidence score based on the similarity score. In an embodiment of the disclosure, the one or more shortlisted actions may include actions from the one or more probable actions with a high confidence score based on the similarity score. In an embodiment of the disclosure, the one or more shortlisted parameters with the highest confidence score may be referred as the action at a top position as referred in FIG. 2. In an embodiment of the disclosure, the one or more shortlisted actions may also be referred as the most probable action. In an embodiment of the disclosure, the one or more shortlisted actions may be recommended by the voice engine 216 to the user such that the one or more shortlisted parameters may substitute a number of default actions responded by the ASR module 218. In an embodiment of the disclosure, the semantic similarity score may be calculated by the processing module 226.

At operation 314, the method includes receiving a review associated with the one or more probable actions determined as the one or more shortlisted actions. In an embodiment of the disclosure, the user provides the review for the action taken. In an embodiment of the disclosure, the action taken may be referred as an action amongst the one or more shortlisted actions selected by the user. In an embodiment of the disclosure, the review may be categorized into any of a positive feedback, and a negative feedback. In an embodiment of the disclosure, the review may be categorized by the action review module 228. In an embodiment of the disclosure, upon determining that the review may correspond to the positive feedback, the method may proceed towards operation 316. Further, upon determining that the review may correspond to the negative feedback, the method may proceed towards operation 318.

At operation 316, the method includes registering the one or more unstructured utterances with associated context into the local database of the device based on a positive-feedback received as a part of the review from the at least one speaker. In an embodiment of the disclosure, the method further includes associating the one or more probable actions with the one or more unstructured utterances within the local database based on the positive feedback. In an embodiment of the disclosure, the positive feedback related to the one or more short listed actions may be based on selection of the one or more probable actions with the high confidence score by the user.

At operation 318, the method includes updating a global model associated with the dynamic bayesian network module 224 based on the negative feedback. In an embodiment of the disclosure, the negative feedback related to the one or more shortlisted actions may be based on rejection of the one or more probable actions by the user. In an embodiment of the disclosure, the negative feedback may further be based on rejection of an action amongst the one or more probable actions with a high confidence score followed by acceptance of another action with the confidence score less than the highest confidence score.

At operation 320, for triggering the updating of the global model, the method includes computing a posterior probability in respect of a non-performance of the recommended one or more probable actions against the one or more unstructured-utterances. In an embodiment of the disclosure, the method further includes comparing the posterior probability related to the non-performance with a first pre-defined threshold of the dynamic bayesian network module 224. Further, the method includes initiating training of the global model based on the posterior probability exceeding the pre-defined threshold. Moving forward, the method includes retraining the global model at least based on the one or more unstructured utterances and the associated context. In an embodiment of the disclosure, the retraining may be based on the posterior probability. Further, the method includes instantiating the trained global model with respect to the device.

Further, in an embodiment of the disclosure, for instantiating the trained global model, the method includes ascertaining the one or more probable actions from the dynamic bayesian network module 224 upon updating of the global model. Further, based on the updating of the global model, the method includes capturing a delta, defining a difference between the one or more probable actions by the dynamic bayesian network module 224 before and after the global update. Further, the method includes deleting historical data related to action-utterance from the local database and storing the delta. In an embodiment of the disclosure, the method also includes, re-generating a set of utterances-action for the local database based on the updated global model.

Continuing with the above embodiment of the disclosure, the method includes initiating the training based on determining at least one of ascertaining if the computed semantic similarity between the one or more probable actions predicted from the dynamic bayesian network and the action-utterance pairs in the local database exceeds a second pre-defined threshold associated with the dynamic bayesian network and ascertaining if the probabilities associated with the one or more probable actions recommended to the at least one speaker differ by minimal extent. The method further includes, updating a control setting of the device in respect of further processing of input utterances.

At operation 322, the method includes initiating training of a global model upon determining that the posterior probability exceeding the threshold value. Furthermore, the method includes retraining the global model at least based on the input utterance and the associated context and instantiating the trained global model with respect to the device.

Further, the instantiating may be based on ascertaining the one or more probable actions from the dynamic bayesian network module 224 upon updating of the global model. In an embodiment of the disclosure, the instantiating may further be based on capturing a delta defining a difference between the one or more probable actions by the dynamic bayesian network module 224 before and after the global update. Further, the method includes deleting historical data related to action-utterance from the local database and storing the delta. Upon deleting the historical data, the method includes re-generating a set of utterances-action for the local database based on the updated global model. In an embodiment of the disclosure, the training may be initiated based on determining whether the similarity score between the one or more probable actions and the action utterance pairs in the local database exceeds another threshold value associated with the dynamic bayesian network module 224. Further, the method includes, ascertaining whether the one or more probable actions recommended to the user differ by a minimal extent or not.

Moving forward, at the operation 324, the method includes training the global model by aggregating the one or more unstructured utterances into a repository of global utterances to register the one or more unstructured utterances within the global model. In an embodiment of the disclosure, the method includes aggregating the one or more unstructured utterances globally at-least based on the context. In an embodiment of the disclosure, the aggregating may be performed by the semantic similarity aggregator 230 referred in FIG. 2.

At operation 326, the method may include the deployment of the global model over a cloud infrastructure. In an embodiment of the disclosure, the deployment may be performed by a distributor 232.

Figure 3B:
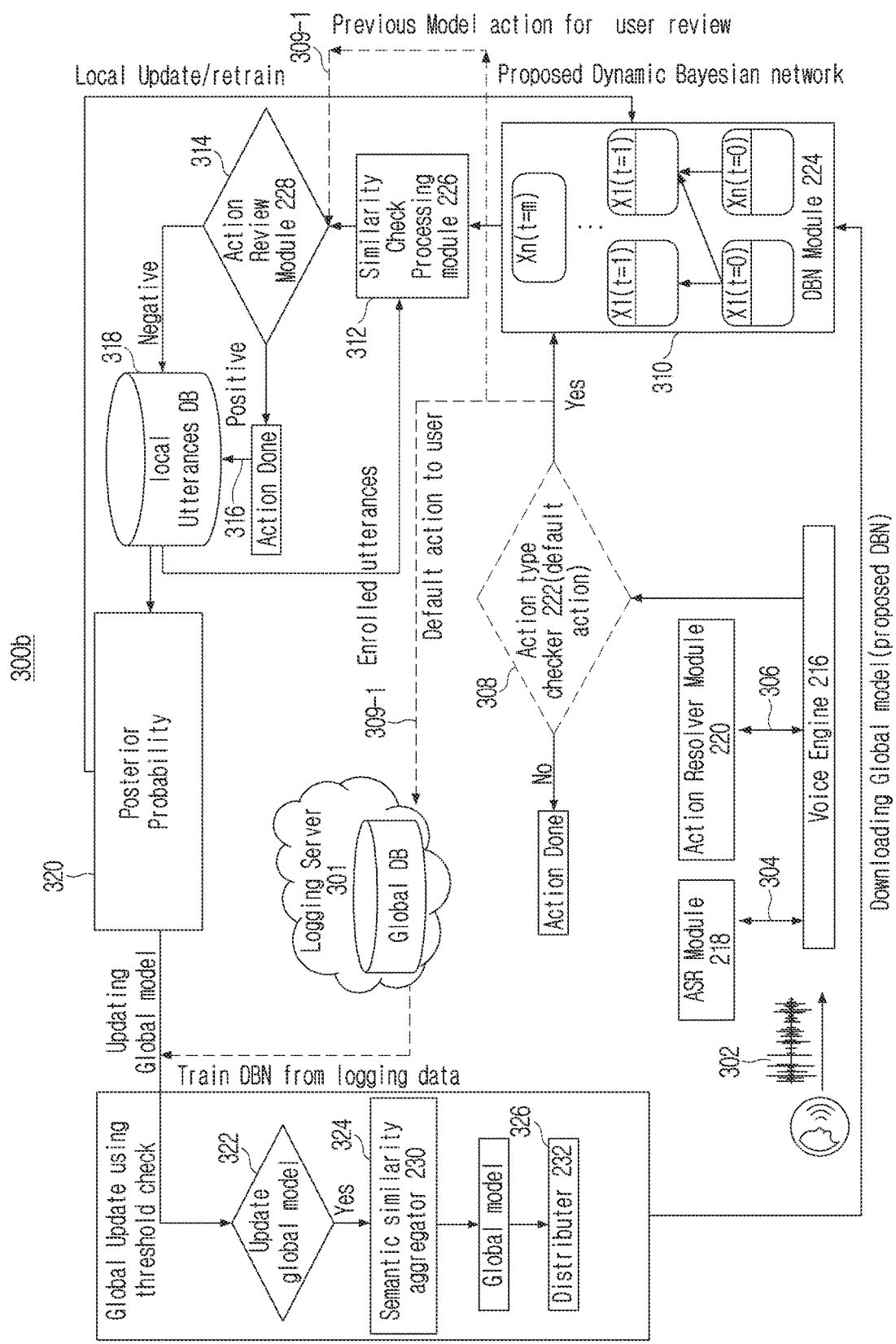
FIG. 3B illustrates an embodiment of an operational flow diagram depicting a method to adaptively predict one or more non-default actions against one or more unstructured utterances, according to an embodiment of the disclosure.

Referring to FIG. 3B, it illustrates an operational flow diagram 300b depicting a method to adaptively predict one or more non-default actions against one or more input utterances according to an embodiment of the disclosure. In an embodiment of the disclosure, the operations 302 through 308 may be performed as depicted in FIG. 3A.

Referring to FIG. 3A, upon ascertaining at the operation 308 that the one or more actions may correspond to the default actions also referred as the one or more default actions, the method may proceed towards operation 309-1.

At operation 309-1, the method includes transmitting the one or more default actions to a global database incorporated via a logging server 301. Specifically, the one or more default actions may be forwarded from the logging server 301 to the global model for further updating of the global model at operation 322 as depicted in FIG. 3A and FIG. 3B. In an embodiment of the disclosure, the automated assistant 202 may use the logging server 301 to collect data of failure utterance which will be used to train the dynamic bayesian network. The trained dynamic bayesian network may determine an alternative response of the default action, also referred as the one or more default actions based on the log data.

In case of VPA, an example response to the unstructured utterance may be depicted as follows:

{"type":22,"viv":{"CapsuleExecutionFinished":{"executionScope":{"capsuleId":"viv.core","goal":"viv.core.UnknownInputText","scopedCapsuleId":"0.0.0-viv.core","goalSignal":"viv.core.UnknownInputText"}}}}

Further, a voice client handles the response in respect of the default cases as shown below:

```
if(evt == VP_MSG_ENGINE_VIV_RESULT)
{VoiceRecogResult * tmp = (VoiceRecogResult*)MsgParam1;
string strViv = tmp->strVivResponse;
SLOGE("VIV Result : %s", strViv.c_str( ));
HCP_LOG("voice_engine : VIV RESULT - %s",strViv.c_str( ));
//below code should be added to activate newly proposed DB
if(strViv.find(viv.core.UnknownInputText) )
{
DBNfindAction(g_utterance,"Didn't Understand") //  proposed DBN activation}else
if(....)
{
// this for search result case.. Proposed DBN activation
DBNfindAction(g_utterance,"search result")
}
Else{.....}
```

Thereafter, subsequent to the operation 309-1, the method includes performing operations 324 and 326 as referred in FIG. 3A.

Alternatively, instead of operation 309-1, operation 309-2 may execute. Execution of operation 309-2 denotes reaching the operation 314 based on the default action without having to undergo the operations 310 and 312 as referred in FIG. 3A. Thereafter, the operations 316 till 326 execute based on the description of FIG. 3A.

Figure 4:
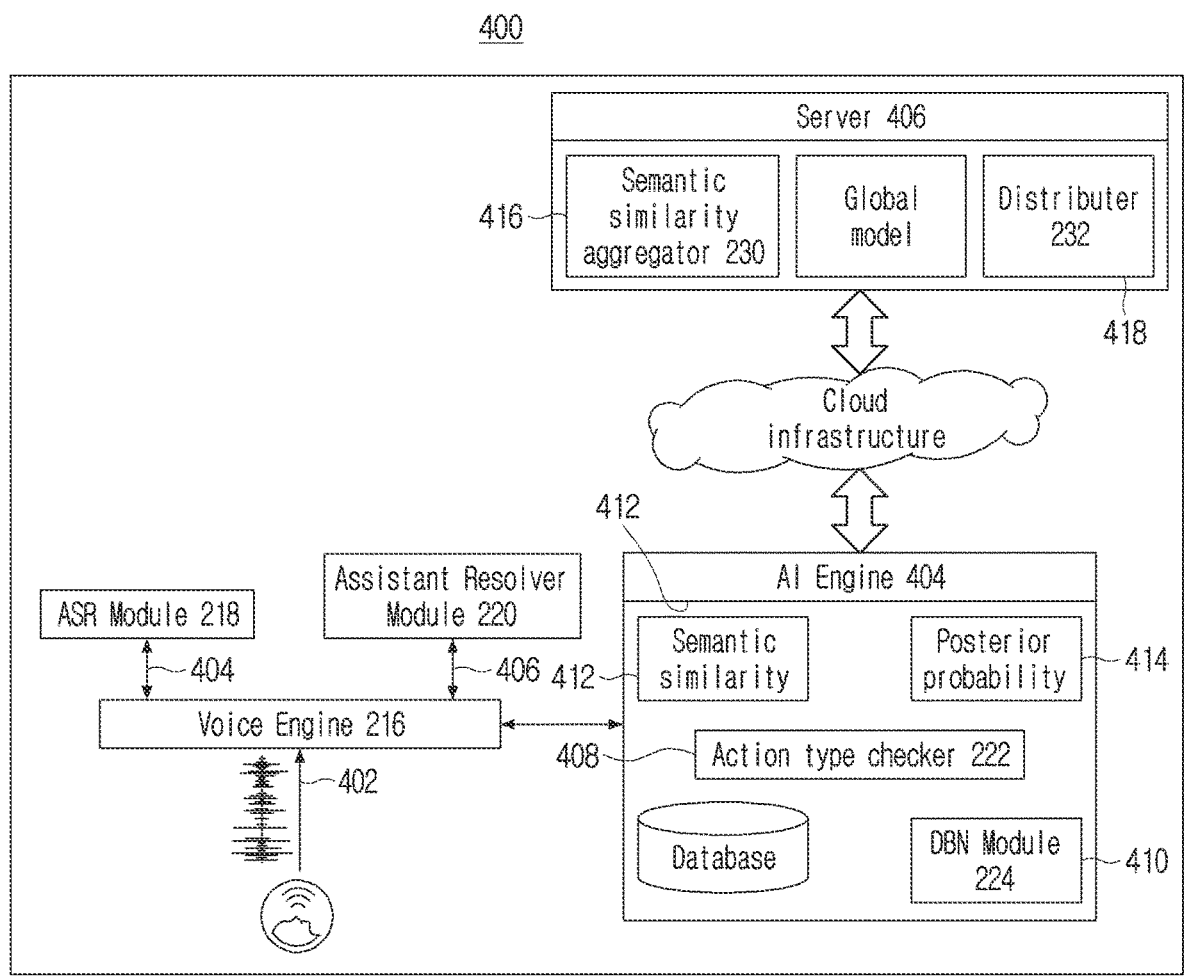
FIG. 4 illustrates an architecture to adaptively predict one or more non-default actions against one or more unstructured utterances, according to an embodiment of the disclosure.

FIG. 4 illustrates an architecture 400 of a method to adaptively predict one or more non-default actions against one or more unstructured utterances according to an embodiment of the disclosure.

Referring to FIG. 4, in an embodiment of the disclosure, the architecture includes the voice engine 216, the ASR module 218, the action resolver module 220, the action type checker 222, the dynamic bayesian network module 224, the semantic similarity aggregator 230, and the distributor 232.

In an embodiment of the disclosure, the architecture 400 may further include an AI engine 404 incorporating the action type checker 222, and the dynamic bayesian network module 224. Further, semantic similarity and the posterior probability may be calculated within the AI engine 404. Further, in an embodiment of the disclosure, the architecture 400 further includes a server 406 incorporating the semantic similarity aggregator 230 and the distributor 232 as a part of the global model update. In an embodiment of the disclosure, the AI engine 402 and the server 404 may be configured to be connected with one another through cloud infrastructure for communication purposes.

At operation 402, the voice-engine 216 may be configured to perform as an interface between at least one speaker providing one or more input utterances and a number of modules incorporated in a voice assistant also referred as the automated assistant 202 in FIGS. 2, 3A, and 3B. In an embodiment of the disclosure, the one or more input utterances may interchangeably be referred as a voice stream.

At operation 404, the voice engine 216 may be configured to send the voice stream to the ASR server also referred as the ASR module 218 in FIGS. 2, 3A, and 3B. In an embodiment of the disclosure, the ASR module 218 may be configured to convert the voice stream into text.

At operation 406, the text may be sent to the action resolver module 220 from the voice engine 216 upon receiving from the ASR server. Furthermore, the action resolver module 220 may be configured to process the text and determine one or more appropriate actions to be performed corresponding to the input utterance. In an embodiment of the disclosure, the one or more appropriate actions may be referred as the one or more actions referred in FIGS. 1, 2, 3A, and 3B.

At operation 408, upon receiving the one or more actions at the voice engine 216, the one or more actions may be sent to the action type checker 222. In an embodiment of the disclosure, the action type checker 222 may be configured to categorize the one or more actions between one or more default actions and one or more non-default actions. In an embodiment of the disclosure, where it is determined that one or more actions are categorized as the one or more non-default actions, the one or more actions may be performed.

At operation 410, where it is determined that the one or more actions are categorized as the one or more default actions, the method may proceed towards the dynamic bayesian network module 224. In an embodiment of the disclosure, the dynamic bayesian network module 224 may be configured to generate probability table also referred as a continuous probability table. The dynamic bayesian network module 224 may be configured to predict one or more probable actions based on the probability table.

In an embodiment of the disclosure, the dynamic bayesian network module 224 may be configured to create an additional node type based on node types extracted as an input from the action type checker. In an embodiment of the disclosure, the node type may include one or more utterances, the one or more actions and a context. Such node types may be accessed from a log or a stored continuous probability table (CPT) of unstructured utterances. The internal node types may be configured to consider all possible values, perform a similarity check and calculate a centroid of utterance corresponding to one utterance against remaining or n−1 number of utterances corresponding to operation 106-2 of FIG. 1. In an embodiment of the disclosure, the additional node type (i.e., a centroid similarity node) and the possible values corresponding to the additional node type affects a probability table thereby providing an improved personalization and generalization.

Further, at operation 412, from an output from the dynamic bayesian network module 224, a semantic similarity may be computed between the one or more probable-actions computed from the dynamic bayesian network module 224 and a number of pre-stored action-utterance pairs from the local database, herein referred as the database.

Further, at operation 414, a posterior probability may be calculated for the one or more probable actions in an embodiment of the disclosure where a user selects an action amongst the one or more probable actions with a confidence score less than the highest confidence score. In an embodiment of the disclosure, the confidence score may be based on the semantic similarity. In an embodiment of the disclosure, where it is determined that the user performs a top action referred as an action amongst the one or more actions with a highest confidence score, a positive feedback may be generated.

Further, at operation 416, the global may be trained. The training may be based on the semantic similarity aggregator 230. In an embodiment of the disclosure, the semantic similarity aggregator 230 may be configured to aggregate the one or more input utterances by into a repository of global utterances to register the input utterance within the global model. Further, the semantic similarity aggregator 230 may be configured to aggregate utterances globally at-least based on the context.

Further, at operation 418, the distributor 232 may be configured for deploying the global model over a cloud infrastructure.

Figure 5:
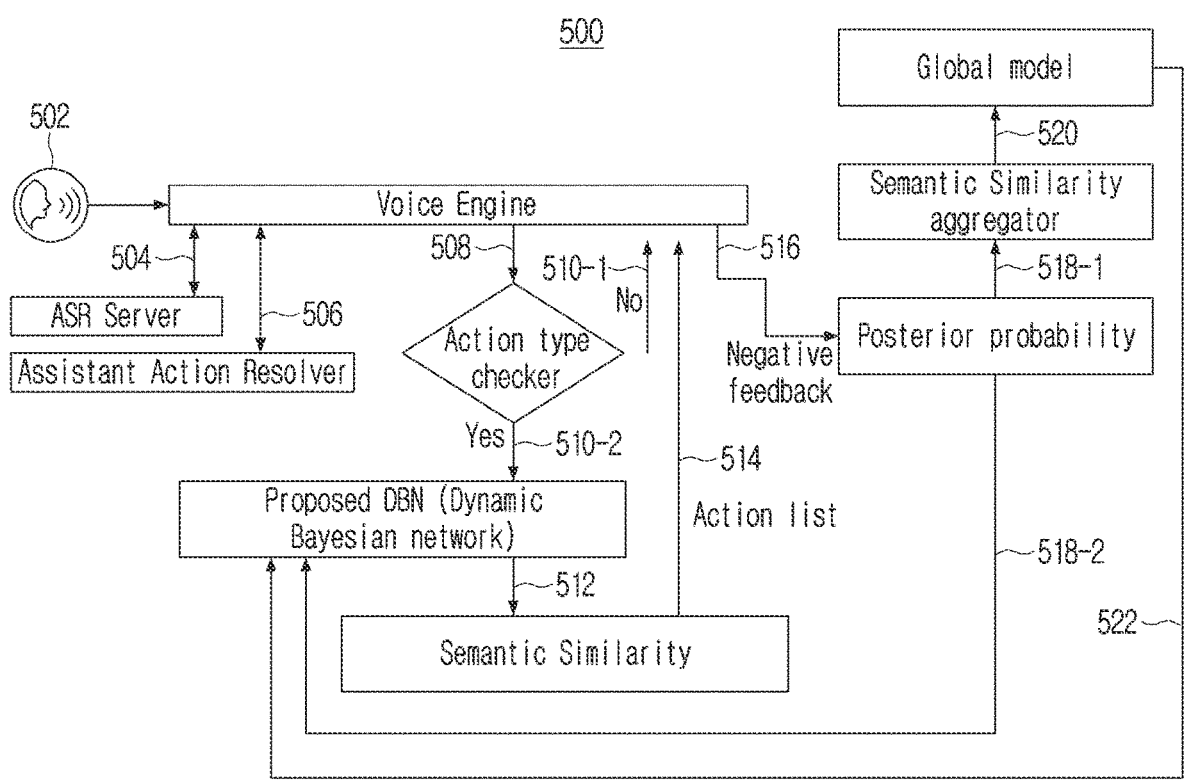
FIG. 5 illustrates an operational flow diagram depicting a process to adaptively predict one or more non-default actions against one or more input utterances, according to an embodiment of the disclosure.

FIG. 5 illustrates a flow diagram 500 depicting a process to adaptively predict one or more non-default actions against one or more input utterances according to an embodiment of the disclosure.

Referring to FIG. 5, in an embodiment of the disclosure, the one or more non-default actions may be predicted based on one or more input utterances received from at least one speaker at a device. In an embodiment of the disclosure, the process may be executed by the automated assistant 202 and the components thereof referred in FIG. 2 incorporated in the device.

At operation 502, for the one or more input utterances also referred as an audio stream, the voice engine may be configured to process the audio stream and pass the audio stream to ASR server to get the one or more input utterances in a text form. In an embodiment of the disclosure, the ASR server may be referred as the ASR module 218. Similarly, the voice engine may be the voice engine 216 referred in FIG. 2.

At operation 504, the ASR server may be configured to extract the text data from the audio stream and send the text to the voice engine 216.

At operation 506, an assistant action resolver may be configured to provide a way to train voice assistant for the different set of utterances. In an embodiment of the disclosure, the assistant action resolver may be the action resolver module 220 from FIG. 2. The utterances may be in grouped called skills or capsule based on assistant and each capsule may responsible to handle some specific kind of tasks. For example, a music capsule is responsible to handle music/songs related utterances for most of the times. Capsules may be trained over certain sets of utterances which are structured and similar to one another in same capsule. The assistant action resolver may provide the most relevant action for a given utterance.

At operation 508, upon determining that the utterance is unstructured, an action type checker determines for type of response (default action/non default action). Further, upon ascertaining the response as a default action, it passes utterance & action to proposed dynamic bayesian network system, here in referred as the dynamic Bayesian network module 224, may execute the non-default action through the voice engine 216. In an embodiment of the disclosure, the action type checker may be the action type checker 222 referred in FIG. 2

At operation 510-1, the process includes one or more actions to be performed in response to the utterance received at the voice engine 216. If an utterance response is not a default action, a resultant action may be performed at the voice engine 216.

At operation 510-2, if an utterance response is a default action then the utterance may be sent to the dynamic bayesian network module. In an embodiment of the disclosure, the dynamic bayesian network module may be referred as the dynamic bayesian network module 224 referred in FIG. 2. In an embodiment of the disclosure, the utterance may be one or more unstructured utterances and the utterance sent to the dynamic bayesian network module may correspond to one or more non-default actions referred in FIGS. 3A and 3B.

At operation 512, the dynamic bayesian network module may be configured to provide a solution to handle unstructured utterances by considering the action performed on the other devices in the same region for the similar set of utterances and also takes speaker's feedback to update the dynamic bayesian network module for future usage.

At operation 514, the semantic similarity module compares the action specified by dynamic bayesian network module with the others utterance-action pairs in the database and provides output having least cosine distance from the unstructured utterance. In an embodiment of the disclosure, the semantic similarity module may be referred as the processing module 226 referred in FIG. 2.

At operation 516, the voice engine 216 may include top three actions and a first action from the top three actions is executed and other actions from the top three actions are displayed to the user. If the user selects any of the other actions displayed, then a review may correspond to a negative feedback. In an embodiment of the disclosure, the top three actions may be referred as the one or more shortlisted actions from FIGS. 3A and 3B.

At operation 518-1, the negative feedback may be provided to posterior probability module. In an embodiment of the disclosure, the posterior probability module may be referred as the action review module 228 referred in FIGS. 3A and 3B. At this stage the module determines for the threshold value to update the global model using a semantic similarity aggregator, to inculcate the given unstructured utterance in the global model. The semantic similarity aggregator may be the semantic similarity aggregator 230 referred in FIG. 2. Inside posterior probability threshold is checked if the value is above threshold it is passed to a global model update via the semantic similarity aggregator.

At operation 518-2, the result of posterior probability may be updated to the dynamic bayesian network module.

At operation 520, the semantic similarity aggregator 230 aggregates all utterances globally based on region, context, or the like.

At operation 522, the global model is retrained using new list of utterances collected from various devices. On global model update, the devices may perform the auto check of the dynamic bayesian network module & maintain delta at local.

Figure 6A:
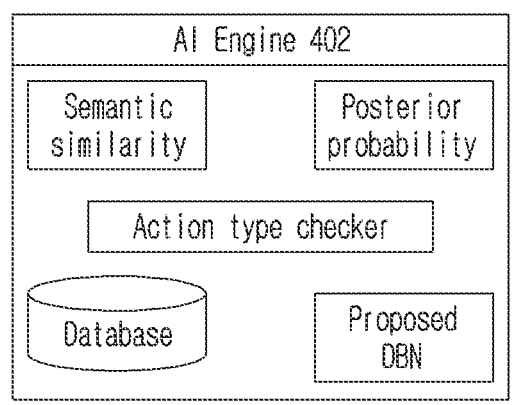
FIG. 6A illustrates artificial intelligence (AI) engine and an architecture of a Bayesian network according to an embodiment of the disclosure.

FIG. 6A illustrates an AI engine 402 according to an embodiment of the disclosure.

Referring to FIG. 6A, in an embodiment of the disclosure, the AI engine 402 may include the action type checker 222, the dynamic bayesian network module 224, and a database. In an embodiment of the disclosure, a posterior probability and a semantic similarity related to one or more probable actions may be calculated within the AI engine 402.

Figure 6B:
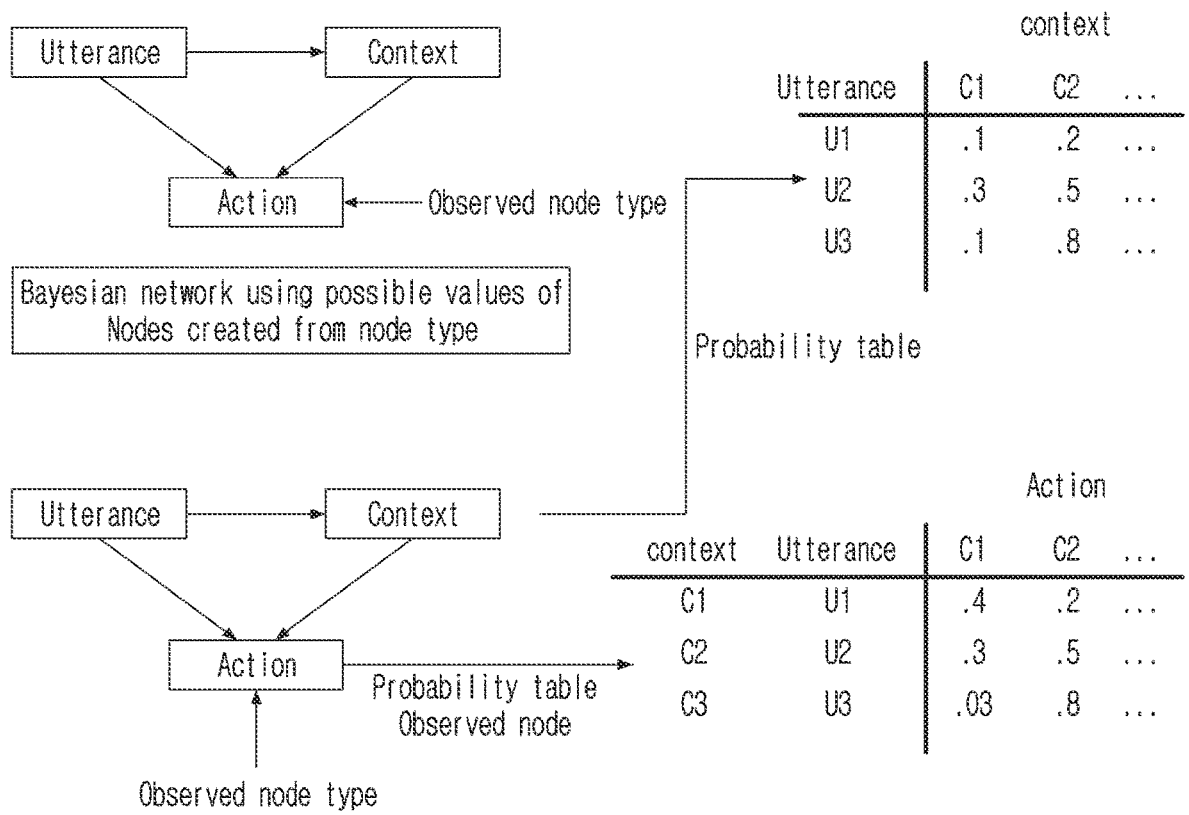
FIG. 6B illustrates an architecture of a dynamic Bayesian network forming a part of the dynamic bayesian network module according to an embodiment of the disclosure.

FIG. 6B illustrates an architecture 600b of a dynamic Bayesian network forming a part of the dynamic bayesian network module 224 in accordance with an existing technique according to an embodiment of the disclosure.

Referring to FIG. 6B, in an embodiment of the disclosure, the Bayesian network may be configured to determine one or more probable actions to be performed based on an input received from a speaker at device incorporating the Bayesian network. In an embodiment of the disclosure, the dynamic bayesian network module 224 may be incorporated in an AI engine of the device.

In an embodiment of the disclosure, the dynamic bayesian network model may be based on "Dynamic Bayesian Networks". Further, the dynamic bayesian network extends standard Bayesian networks with the concept of time such that a time series or sequences may be modelled. In an embodiment of the disclosure, the Bayesian network may be configured to model complex multivariate time series, such that the relationships between multiple time series in the same model may be modelled along with a number of regimes of behavior, as the time series may often behave differently in different contexts.

In an embodiment of the disclosure, the bayesian network may be configured to support the multivariate time-series (i.e., not restricted to a single time series/sequence). The dynamic bayesian network may further support the time series and sequences, or both in the same model.

In an embodiment of the disclosure, the dynamic bayesian network may further be configured to support an anomaly detection support, a number of complex temporal queries, such as $P(A, B[t=8], B[t=9], C[t=8]|D, E[t=4])$, a most probable sequence, a prediction, filtering, smoothing, latent temporal variables (discrete and continuous), mix temporal and non-temporal variables in the same model, parameter learning of temporal models, structural learning of temporal models, log likelihood—useful for time series anomaly detection.

Due to a graphical representation and modelling versatility corresponding to the dynamic bayesian network, the dynamic bayesian network may be configured to facilitate the problem-solving process in probabilistic time-dependent applications. The dynamic bayesian network accordingly operates to model time-based (dynamic) probabilistic problems and also enable intuitive representation by means of a graph-based tree.

In an embodiment of the disclosure, the dynamic bayesian network may be utilized to express a joint probability of events that characterizes a time-based (dynamic) system, and the relationships between events are expressed by conditional probabilities. Given evidence (observations) about events of the dynamic bayesian network, and prior probabilities, statistical inference is accomplished using the Bayes theorem. Inference in pattern recognition applications may be the process of estimating the probability of the classes/categories given the observations, the class-conditional probabilities, and the priors. When time is involved, usually the system is assumed to evolve according to the first-order Markov assumption and, as consequence, a single time slice is considered.

Figure 13:
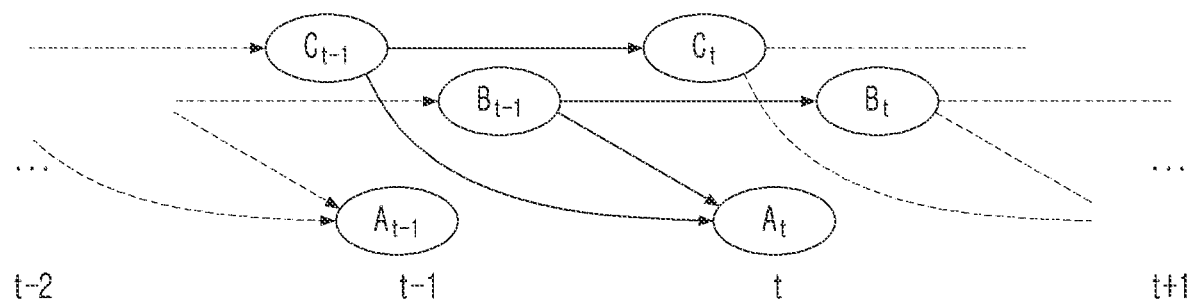
FIG. 13 illustrates a representation of a DBN composed by 3 variables according to an embodiment of the disclosure.

FIG. 13 illustrates a representation of the DBN composed by 3 variables according to an embodiment of the disclosure.

Referring to FIG. 13, the dynamic bayesian network, a temporal bayesian network, a time series network interchangeably represent the same model. In an example, previously used relevant utterances may be used in accordance with the subject matter to find the most appropriate action for the current unstructured utterances.

In an example, the state of the art dynamic bayesian network may be depicted using node type of three category as follows:
1: Utterance (U1, U2, U3, . . . ) e.g., Sports, News, . . .
2: Context (C1, C2, C3, . . . ) e.g., currently broadcasted, . . . .
3: Action (A1, A2, A3, . . . ) e.g., tune, tune on app . . .

Figure 7:
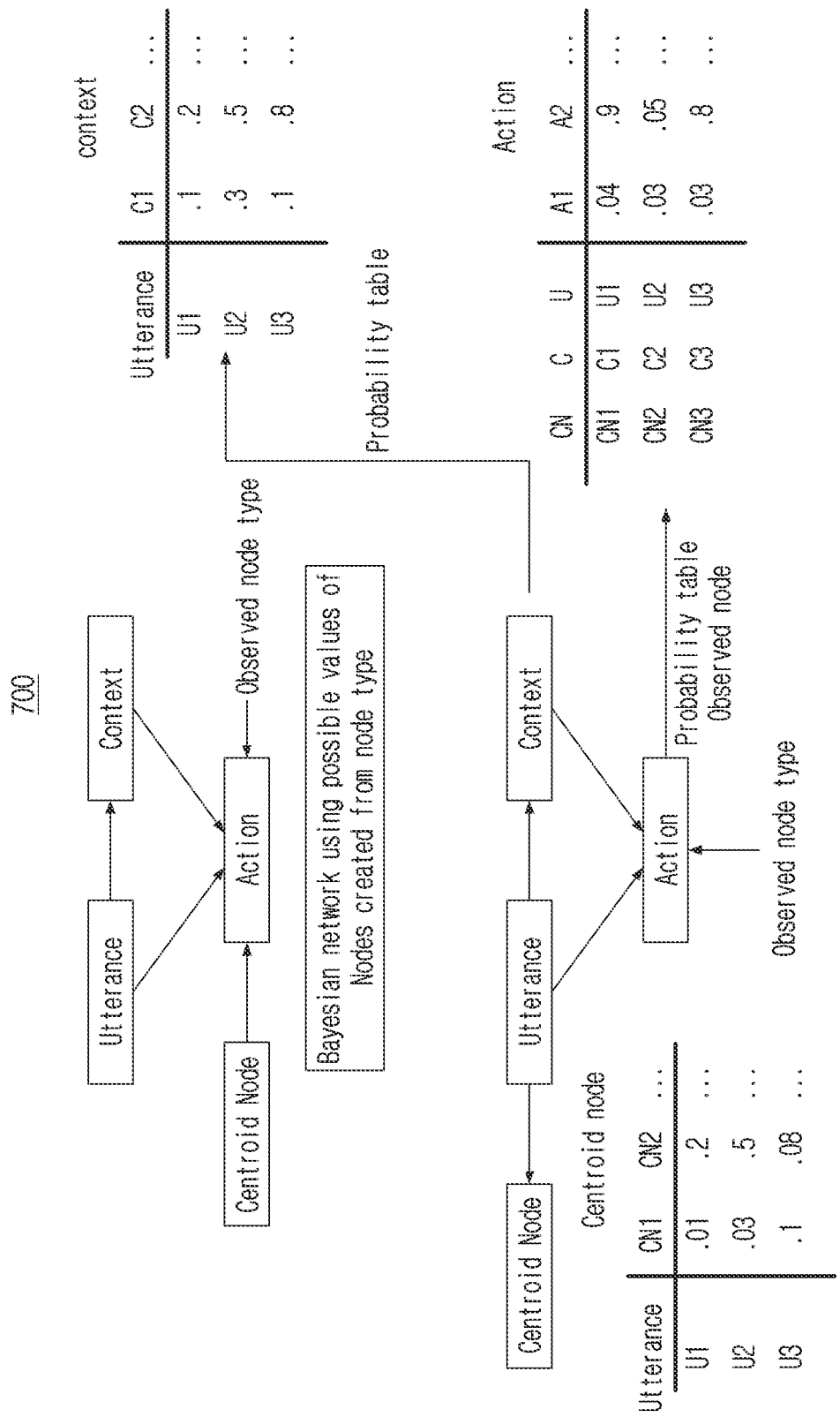
FIG. 7 illustrates an architecture of a dynamic bayesian network module, according to an embodiment of the disclosure.

FIG. 7 illustrates an architecture 700 of a dynamic bayesian network module 224 according to an embodiment of the disclosure.

In respect of the Bayesian network and from the axioms of probability, the state of the art Bayes Theorem may be depicted as follows:

$$P(A,B)=P(A|B)P(B)=P(B|A)P(A)=>P(A|B)=P(B|A)P(A)/P(B)$$

Referring to FIG. 7, in an embodiment of the disclosure, the Bayesian theorem may allow an update in a distribution Q (over one or more variables), in the light of new evidence e. $P(Q|e)=P(e|Q)P(Q) P(e)$. The term $P(Q)$ may be a prior or marginal probability of Q, and $P(Q|e)$ may be the posterior probability of Q. The term $P(e)$ may be a probability of evidence, and a normalization factor such that the resulting probability may sum to 1. The term $P(e|Q)$ may also be referred as a likelihood of Q given e, denoted $L(Q|e)$ as e, $P(e|Q)$ is a measure of a likelihood the Q causing the evidence. Inference is the process of calculating a probability distribution of interest e.g., $P(A|B=True)$, or $P(A,B|C, D=True)$. The terms inference and queries are used interchangeably.

The centroid may be used to represent 1 vs rest n−1 utterance semantic similarity centroid. Such newly created node type in proposed dynamic bayesian network helps learn the relationship between existing utterance & predicted action. The dynamic bayesian network provides the inference for the most probable action-utterance as output of Proposed dynamic bayesian network and then comes the semantic similarity stage. In an embodiment of the disclosure, the inference with different semantics may also be referred as a prediction focused around inferring outputs from inputs, a diagnostic for inferring the inputs from the outputs. In an embodiment of the disclosure, the inference may also be referred as a supervised anomaly detection, an un-supervised anomaly detection, and a decision making under uncertainty. In an embodiment of the disclosure, the supervised anomaly detection may essentially be similar to the prediction. For the un-supervised anomaly detection inference may be used to calculate the $P(e)$ or more commonly $\log(P(e))$. Further, the decision making under uncertainty may include optimization and inference combined.

The Bayesian Network understanding using node type as depicted in FIG. 6B and a further created similarity, centroid node (CN) may be depicted as follows:
1: Utterance [U] (U1, U2, U3, . . . ) e.g., WWF, News, . . .
2: Context [C](C1, C2, C3, . . . ) e.g., currently broadcasted, . . . .
3: Action (A1, A2, A3, . . . ) e.g., tune, tune on app . . .
4: centroid node [CN](CN1, CN2, . . . )

Figure 8:
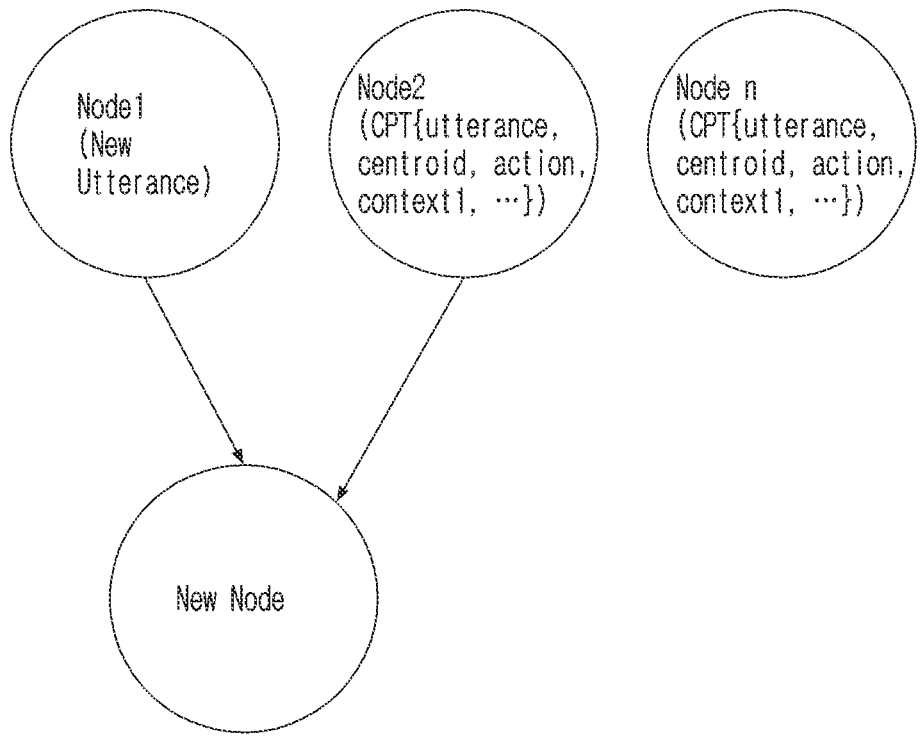
FIG. 8 illustrates a diagram depicting an internal representation of a dynamic bayesian network module according to an embodiment of the disclosure.

FIG. 8 illustrates a diagram 800 depicting an internal representation of a dynamic bayesian network module 224 according to an embodiment of the disclosure.

Referring to FIG. 8, in an embodiment of the disclosure, a "node m" may be generated based on a number of previous nodes. In an embodiment of the disclosure, the "node m" may also be referred as the additional node or centroid similarity node as generated in accordance with the subject matter. In an embodiment of the disclosure, each node may represent an utterance and is associated with further nodes representing a number of parameters associated with the utterances. In an embodiment of the disclosure, the number of parameters may include a centroid, a context and one or more actions associated with the utterance.

In an embodiment of the disclosure, a centroid of the utterances may be calculated with respect to each utterance in the continuous probability table (CPT) of each node. Further, the centroid may be passed onto a number of children nodes as referred Table 1.

TABLE 1

| Utterances | Centroid | Context 1 (app name) | Context 2 (competency) | ... | actions |
|---|---|---|---|---|---|
| Play Serial 1 on app 1 | 0.2 | app 1 | Movie and shows, ... | ... | Launch app 1 & play video |
| Play Serial 1 on service xyz | 0.21 | Broadcasting service | Live service, ... | ... | Tune to service |
| Basketball raptor on app2 | 0.145 | app 2 | Live matches... | ... | Launch app 2 & play video |
| ... | ... | ... | ... | ... | ... |

In an embodiment of the disclosure, the dynamic bayesian network module 224 may be configured to calculate a probability of the one or more actions at each node in the dynamic bayesian network through a metadata table provided to the dynamic bayesian network module 224 and shown in FIG. 8.

Further, a similarity of a new utterance at node 1 may be calculated with utterances in a node 2, other parent nodes (of the node m) and the metadata table. In an embodiment of the disclosure, the probability of each of the utterances may be calculated based on a posterior probability.

$$P(A \mid B) = \frac{P(B \mid A)P(A)}{P(B)}$$

The utterances may be calculated from one or more probable actions from the one or more actions using:

P(utterance, Action, Context1, context2, context3, context4)
=P(context4|context1,context2,context3)P(utterance, Action, Context1, context2, context3)
=P(context4|context1,context2,context3)P(context1|utterance,context3)P(context2|Action)P(context3|Action)P(Action, utterance)
=P(context4|context1,context2,context3)P(context1|utterance,context4)P(context2|Action)P(context3|Action)P(Action|utterance)P(utterance)

In an embodiment of the disclosure, a context1 may represent a centroid node type. Further, other contexts may be corresponding to a device incorporating the automated assistant 202. The utterances may be further passed to the semantic similarity aggregator. Existing dynamic bayesian network only takes prior probability of events into picture to update CPT at any node but proposed model calculates centroid of every utterance with respect to every other utterance in the table then uses this information to calculate similarity with the parent nodes utterances. Then using posterior probability it calculates the probability of actions. Relevant Set of utterances (as probabilities) are extracted as the output of dynamic bayesian network. Then this information is passed on to the semantic similarity module to get the most appropriate action.

The forthcoming description refers FIG. 3 again from operation 312 onwards to refer the stages of calculating of sematic similarity followed by global update.

Referring back to operation 312 of FIGS. 3A and 3B, the semantic similarity may be easily understood as "how much a word A is related to the word B?". Here cosine similarity represents a metric used to determine how similar the strings/utterances are irrespective of their size.

The semantic similarity measures the cosine of the angle between two vectors projected in a multi-dimensional space.

In this context, the two vectors are arrays containing the word counts of two utterances. When plotted on a multi-dimensional space, where each dimension corresponds to a word in the utterance, the cosine similarity captures the orientation (the angle) of the words and not the magnitude.

For two vectors a and b, cosine similarity is calculated as:

$$\cos\theta = \frac{\vec{a} \cdot \vec{b}}{\|\vec{a}\|\|\vec{b}\|}$$

$$\|\vec{a}\| = \sqrt{a_1^2 + a_2^2 + a_3^2 + \ldots + a_n^2}$$

$$\|\vec{b}\| = \sqrt{b_1^2 + b_2^2 + b_3^2 + \ldots + b_n^2}$$

By measuring a cosine of the angle between the vectors, binaries, such as 0 to 1 or −1 to 1 may be obtained that is indicative of this similarity. The smaller the angle, the bigger (closer to 1) the cosine value, and also the higher the similarity.

A Local Utterances DB corresponding to the operation 318 of FIG. 3 provides the relevant utterances that has already been occurred/faced by the devices in the region. Similarity check determines the angle between output utterance of the dynamic bayesian network. At this stage, most probable action is performed and the three out of the rest most probable action are shown to the user for the Action Review. If user further goes with another action then negative feedback is generated to update the dynamic bayesian network based predictor.

Referring to operation 314, user feedback is taken after the action got fired using action review module of the model. In an embodiment of the disclosure, the action review module may be the action review module 228 referred in FIG. 2. Action review displays other less probable options/actions, that if chosen lead to update in the dynamic bayesian network predictor. If user provides the negative feedback for the operation/action performed then posterior probability is calculated for the unstructured utterance and the database also gets updated.

Posterior Probability refers the conditional probability of a given event, which is computed after observing a second event whose conditional and unconditional probabilities were known in advance. It is computed by revising the prior probability, that is, the probability assigned to the first event before observing the second event.

For example, A and B may be two events whose prior probabilities P(A) and P(B) are known. And if we assume that also the conditional probability P(B|A) is known, then by Bayes rule:

$$P(A|B) = \frac{P(B|A)P(A)}{P(B)}$$

The conditional probability P(A|B), thus computed is called posterior probability. Then the posterior probability for that action not to be taken given the current unstructured utterance, is passed to the current dynamic bayesian network predictor. Threshold is used to check whether to update the Global Model or not.

Specifically, in posterior probability threshold checker is set at the device level to check when to push local changes for global update, it pushes the required data for the global update of predictor. On training completion, the updated global models are pushed back to all clients for assistant action performance improvement. The client may receive the new model update notification and can decide if global model update is required or not.

Referring to operation 324, which depicts the semantic similarity aggregator 230 and the global model, the device pushes the list of utterances for global model training when semantic similarity is very far or/and predicted actions probability is very close. On global model is update at client side, action-utterance related data from local database is discarded after storing the delta (utterance vs action vs state). The client system re-generates the set of utterances-action for the local devices based on the global model for same context/region. This provides the enhanced user experience and hassle-free interaction. After the dynamic bayesian network module 224 gets downloaded user will be provided with the enhanced smartness of the system which considers the action performed for other user in the same region for similar utterances.

Figure 9:
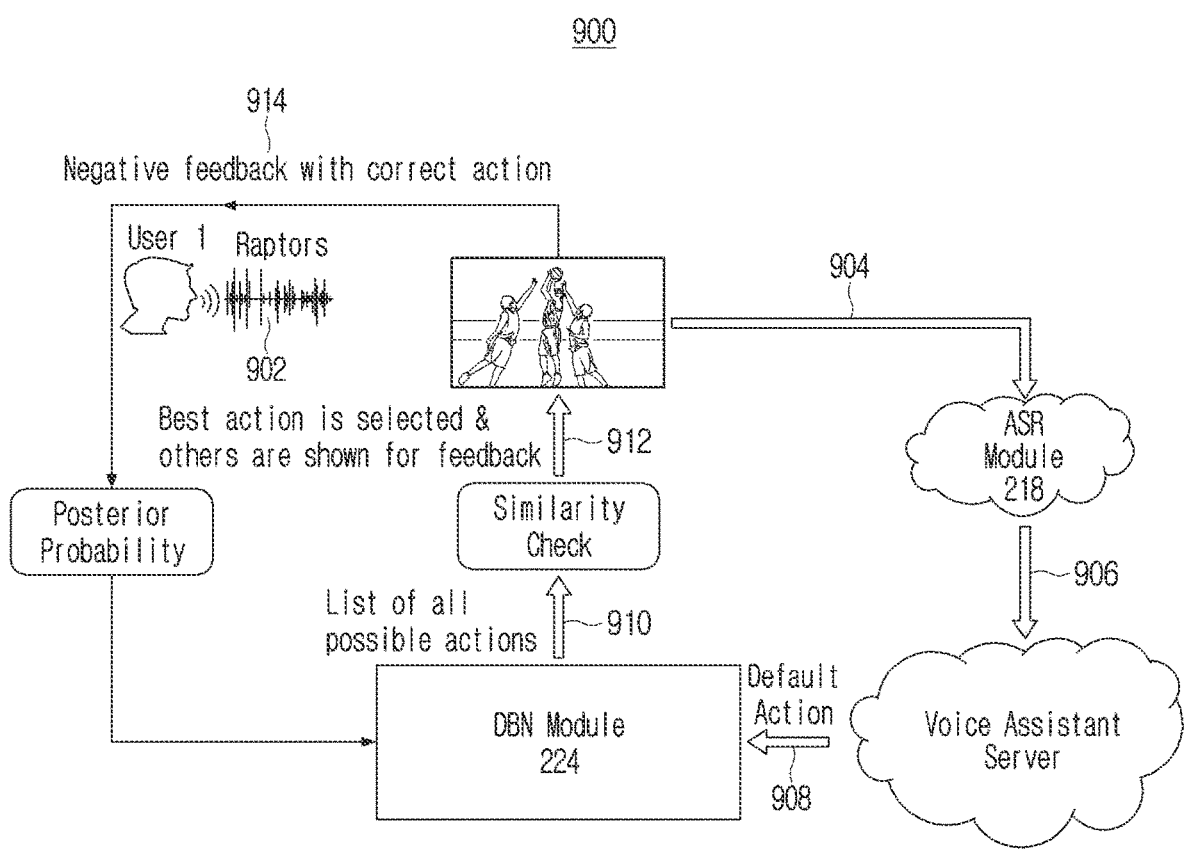
FIG. 9 illustrates a use case diagram to adaptively predict one or more non-default actions against one or more input utterances, according to an embodiment of the disclosure.

FIG. 9 illustrates a use case diagram 900 to adaptively predict one or more non-default actions against one or more input utterances according to an embodiment of the disclosure.

Referring to FIG. 9, at operation 902, a user tried to give command 'Hi Bixby' (unstructured utterance) (operation 902).

At operation 904, device communicates with ASR server to get utterance in text form (operation 904).

At operation 906, in case of default action provided by Assistant Server for the unstructured utterances, the device will invoke Proposed Dynamic Bayesian network model.

At operation 908, the dynamic bayesian network model will calculate most probable actions using the metadata and the previous similar utterances it has faced.

At operation 910, most probable actions are passed to similarity check module, this module calculates ranking of these most probable actions (top three).

At operation 912, amongst top actions, best action will be executed & rest will be shown to user for feedback (operation 912).

At operation 914, based on user action, a posterior probability module is invoked. This module will further update Proposed dynamic bayesian network based on feedback from user.

Figure 10:
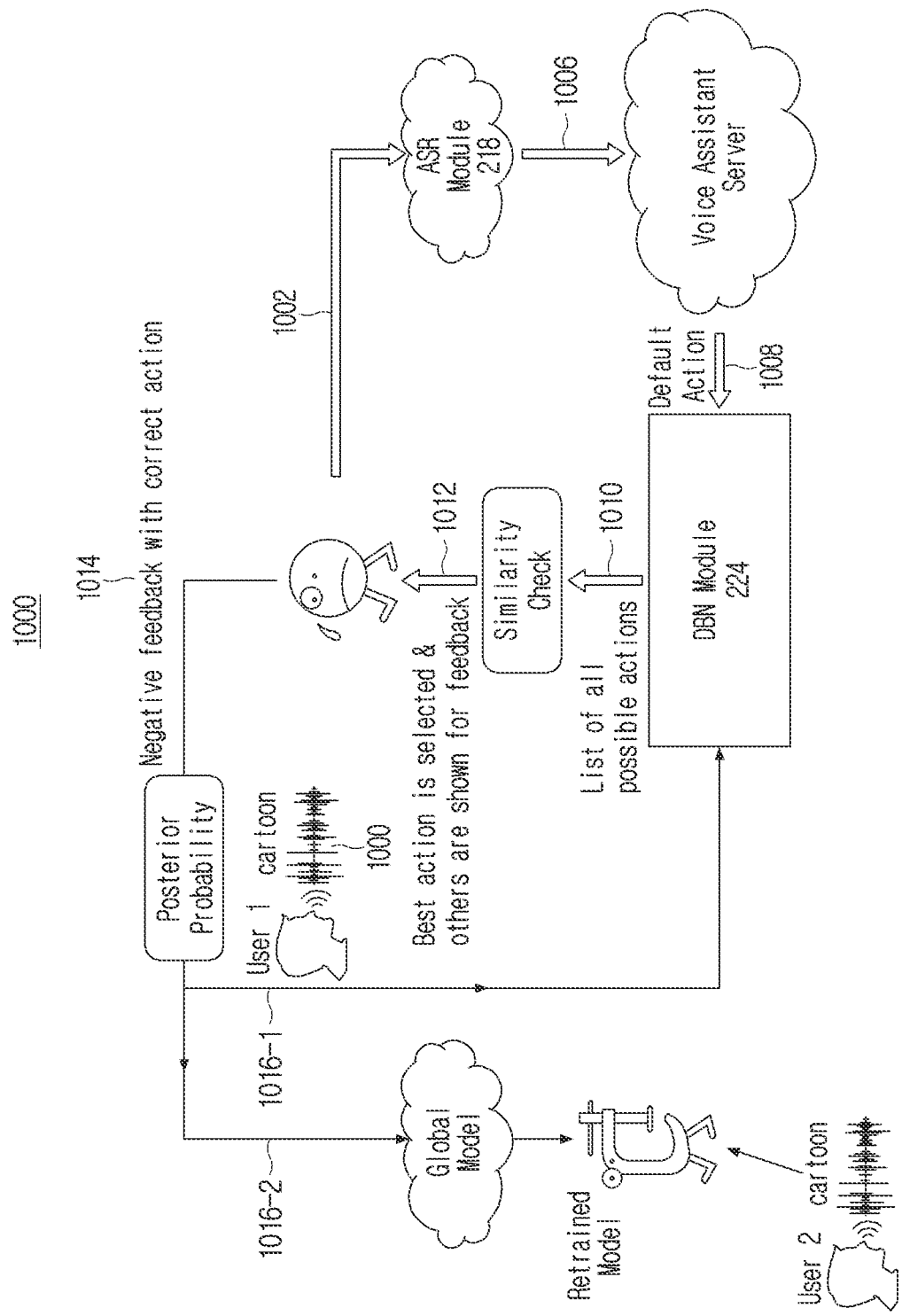
FIG. 10 illustrates a use case diagram to adaptively predict one or more non-default actions against one or more input utterances, according to an embodiment of the disclosure.

FIG. 10 illustrates a use case diagram 1000 to adaptively predict one or more non-default actions against one or more input utterances according to an embodiment of the disclosure.

Referring to FIG. 10, at operation 1002, a Novice user (user 1) who is not familiar with assistant usage tries to give command 'Hi Bixby—cartoon' (unstructured utterance).

At operation 1004, the ASR module 218 may provide the utterance in text form ('cartoon') to the device.

At operation 1006, a voice assistant provides the default action ('Switching to web browser'/'I do not understand') to the User.

At operation 1008, while seeing unstructured utterances & default action, device will invoke Proposed Dynamic Bayesian network model, the dynamic bayesian network model will calculate most probable actions.

At operation 1010, most probable actions are passed to similarity check module, and the module calculates ranking of these most probable actions (top 3).

At operation 1012, amongst top 3 actions, best action will be executed & rest 2 will be shown to user for feedback.

At operation 1014, if the user is not satisfied by the action performed by the Assistant and selects some other actions provides at operation 6 (in above example he selects cartoon live broadcast), it'll provide the negative feedback to the Posterior Probability module.

At operation 1016, Posterior Probability module passes these changes to Global model, here Global Model is retrained using new list of utterances collected from various devices and retrained model is pushed back to devices, so that if some other user tries the similar utterance, he will get the required result at the first place (operation 1016-1). On global model update, all the devices will perform the auto check of the dynamic bayesian network model 224 & maintain delta at local (operation 1016-2). Now, user2 who is also interested to watch 'cartoon' can give command, this time device identifies and acted accordingly.

Figure 11:
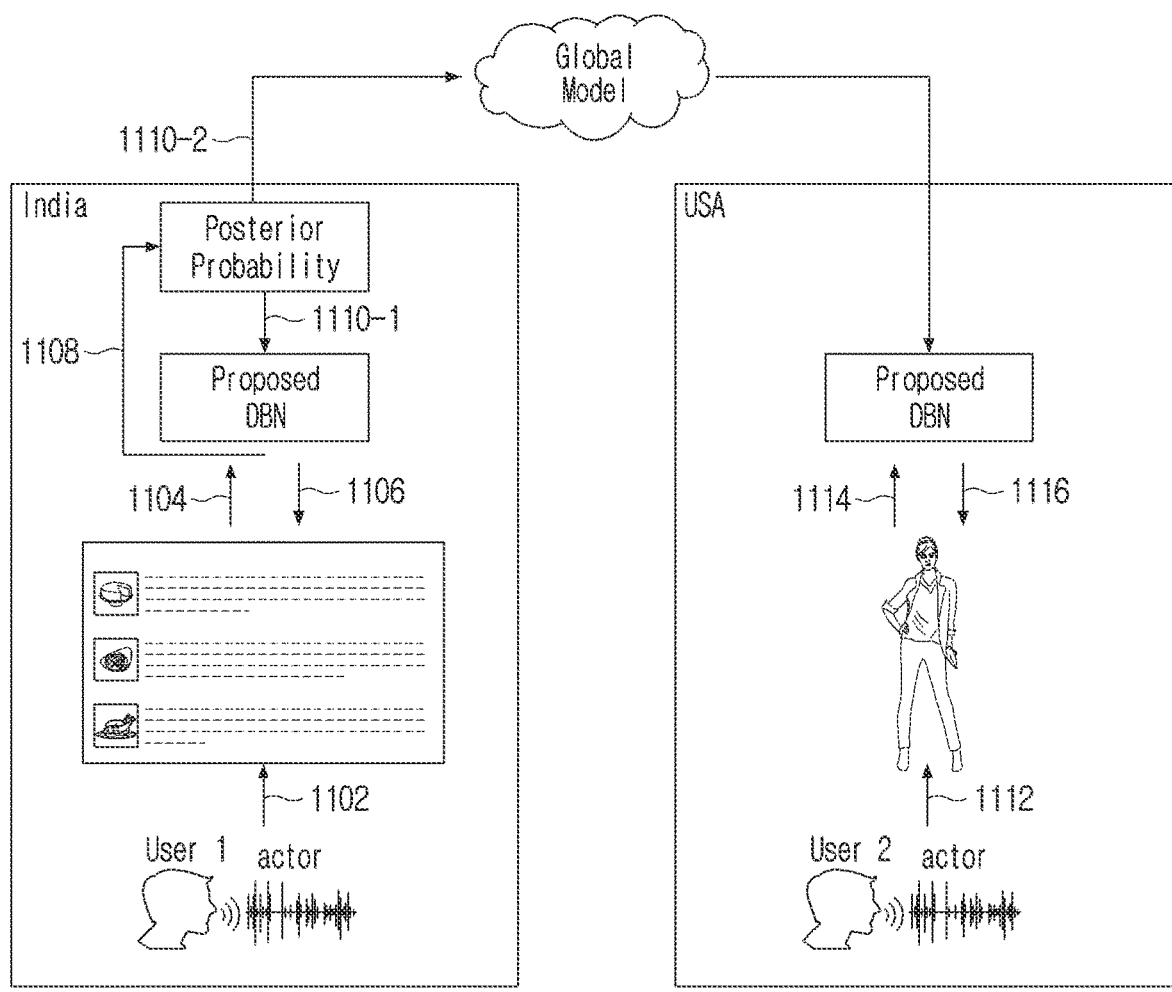
FIG. 11 illustrates a use case diagram to adaptively predict one or more non-default actions against one or more input utterances, according to an embodiment of the disclosure.

FIG. 11 illustrates a use case diagram 1100 to adaptively predict one or more non-default actions against one or more input utterances according to an embodiment of the disclosure.

Referring to FIG. 11, at operation 1102, a Novice user (user 1) who is not familiar with assistant usage tries to give command 'Hi Bixby—actor' (unstructured utterance).

At operation 1104, while seeing unstructured utterances & default action, device will invoke Proposed Dynamic Bayesian network model, the dynamic bayesian network model will calculate most probable actions.

At operation 1106, most probable actions are passed to similarity check module, this module calculates ranking of these most probable actions(top 3). Amongst top 3 actions, best action will be executed & rest 2 will be shown to user for feedback (operation 1106).

At operation 1108, If the user is not satisfied by the action performed by the Assistant and selects other actions, a negative feedback may be provided to the Posterior probability Module (operation 1108).

At operation 1110, posterior probability module passes it to global model, it is retrained using new list of utterances collected from various devices and retrained model is pushed back to devices (operation 1110-1). On global model update, all the devices will perform the auto check of the dynamic bayesian network module 224 and maintain delta at local (operation 1110-2).

At operation 1112, user2 who is also interested to watch 'actor' related content can give command.

At operation 1114, the dynamic bayesian network module 224 on the device of User2 will provide the action most relevant to the utterance for the user2 at the first place.

At operation 1116, this time device identifies and acted accordingly and tune to news channel playing actor related news.

Figure 12:
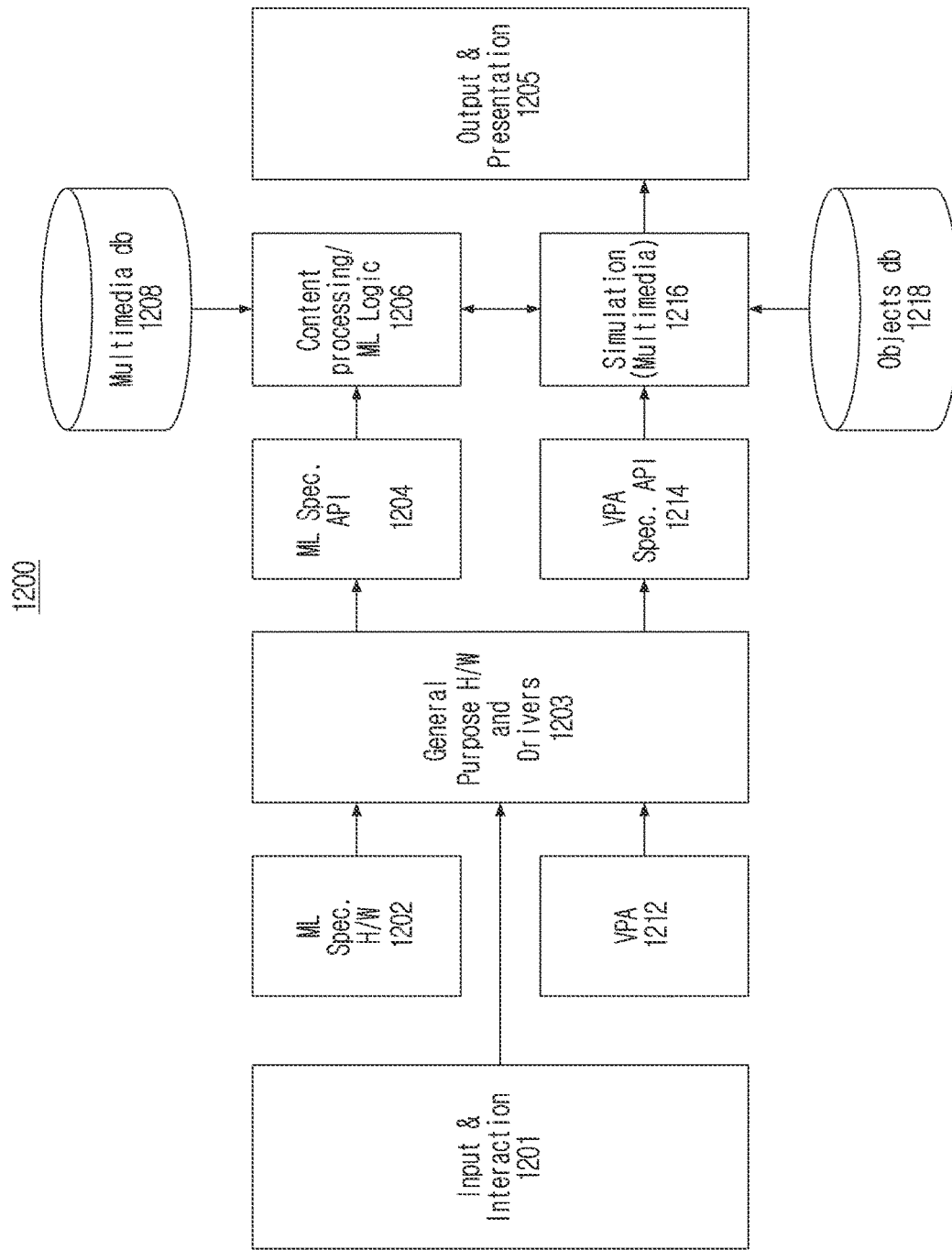
FIG. 12 illustrates a representative architecture to provide tools and development environment described herein for a technical-realization of an implementation in FIG. 1 and FIG. 11 through an AI model-based computing device, according to an embodiment of the disclosure.

FIG. 12 illustrates a representative architecture 1200 to provide tools and development environment described herein for a technical-realization of the implementation in preceding figures through a virtual personal assistance (VPA) based computing device according to an embodiment of the disclosure.

FIG. 12 is merely a non-limiting example, and it will be appreciated that many other architectures may be implemented to facilitate the functionality described herein. The architecture may be executing on hardware, such as a computing machine 200 of FIG. 2 that includes, among other things, processors, memory, and various application-specific hardware components.

Referring to FIG. 12, the architecture 1200 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., universal serial bus (USB) drivers), Wi-Fi® drivers, audio drivers, power management drivers, and so forth depending on the hardware configuration.

A hardware interface layer includes libraries which may include system libraries, such as file-system (e.g., C standard library) that may provide functions, such as memory allocation functions, string manipulation functions, mathematic functions, and the like. In addition, the libraries may include API libraries, such as audio-visual media libraries (e.g., multimedia data libraries to support presentation and manipulation of various media format, such as moving picture experts group 4 (MPEG4), H.264, MPEG audio layer 3 (MP3), advanced audio coding (AAC), adaptive multi-rate (AMR), joint photographic expert group (JPG), PNG), database libraries (e.g., SQLite that may provide various relational database functions), web libraries (e.g., WebKit that may provide web browsing functionality), and the like.

A middleware may provide a higher-level common infrastructure, such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Further, the architecture 1200 depicts an aggregation of VPA based mechanisms and ML/NLP based mechanism in accordance with an embodiment of the subject matter. A user-interface defined as input and interaction 1201 refers to overall input. It can include one or more of the following—touch screen, microphone, camera or the like. A first hardware module 1202 depicts specialized hardware for ML/NLP based mechanisms. In an example, the first hardware module 1202 comprises one or more of neural processors, FPGA, DSP, GPU, or the like.

A second hardware module 1212 depicts specialized hardware for executing the VPA device-related audio and video simulations 1216. ML/NLP based frameworks and APIs 1204 correspond to the hardware interface layer for executing the ML/NLP logic 1206 based on the underlying hardware. In an example, the frameworks may be one or more or the following—Tensorflow, Café, NLTK, GenSim, ARM Compute or the like. VPA simulation frameworks and APIs 1214 may include one or more of—VPA Core, VPA Kit, Unity, Unreal, or the like.

A database 1208 depicts a pre-trained voice feature database. The database 1208 may be remotely accessible through cloud. In other example, the database 1208 may partly reside on cloud and partly on-device based on usage statistics.

Another database 1218 refers the speaker enrollment DB or the voice feature DB that will be used to authenticate and respond to the user. The database 1218 may be remotely accessible through cloud. In other example, the database 1218 may partly reside on the cloud and partly on-device based on usage statistics.

A rendering module 1205 is provided for rendering audio output and trigger further utility operations as a result of user authentication. The rendering module 1205 may be manifested as a display cum touch screen, monitor, speaker, projection screen, or the like.

A general-purpose hardware and driver module 1203 corresponds to the computing device 200 as referred in FIG. 2 and instantiates drivers for the general purpose hardware units as well as the application-specific units (1202, 1212).

In an example, the NLP/ML mechanism and VPA simulations underlying the architecture 1200 may be remotely accessible and cloud-based, thereby being remotely accessible through a network connection. A computing device, such as a VPA device may be configured for remotely accessing the NLP/ML modules and simulation modules may comprise skeleton elements, such as a microphone, a camera a screen/monitor, a speaker, or the like.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown, nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method to adaptively predict non-default actions against unstructured utterances by an automated assistant operating in a computing-system, the method comprising:
   extracting voice-features based on receiving an input utterance from at-least one speaker by an automatic speech recognition (ASR) device;
   identifying the input utterance as an unstructured utterance based on the extracted voice-features and a mapping between the input utterance with one or more default actions as drawn by the ASR;
   obtaining at least one probable action to be performed in response to the unstructured utterance through a dynamic bayesian network (DBN);
   receiving a review of the recommended at least one probable action from the speaker of the input utterance;
   receiving a negative feedback towards the recommended at least one probable action in response to the input-utterance from the speaker during the reviewing; and
   updating a global model associated with the DBN based on the negative feedback,
   wherein the negative feedback corresponding to rejection of all of the recommended actions by the speaker and rejection of high recommended actions followed by acceptance of less recommended action by the speaker.

2. The method of claim 1, wherein the obtaining of the at least one probable action comprising:
   accessing a log of previous unstructured utterances and the input utterance from the DBN, each of the utterance defined by a context parameter;
   identifying a set of similar utterance similar to the input utterance, by obtaining a centroid and a similarity parameter for each of the previous unstructured utterance and the input utterance; and
   obtaining a plurality of probable actions linked to at least one the input utterance and the set of similar utterances based on posterior probability computation for each probable action.

3. The method of claim 1, wherein the identifying of the input utterance as an unstructured utterance based on the extracted voice-features comprises:
   identifying absence of a regular-action in response to the input utterance from an action resolver device forming a part of the ASR device; and
   identifying the default-action as being mapped with the input utterance from the action resolver device.

4. The method of claim 2,
   wherein the log of the unstructured utterance comprises a plurality of parameters for the unstructured utterance as at least one of the context, centroid similarity, or predicted action, and
   wherein the predicted action is obtained by the unstructured utterance as the posterior probability based on the context and centroid similarity associated with the utterance.

5. The method of claim 2, wherein the obtaining of the plurality of probable actions comprises obtaining the posterior probability for the predicted action based on the context and the centroid similarity associated with the set of similar utterances and the input utterance.

6. The method of claim 2, further comprising:
   accessing pre-stored action-utterance pairs in a local database of a device associated with the speaker;
   obtaining a semantic similarity between the plurality of probable-actions computed from the DBN and the pre-stored action-utterance pairs from the local database; and
   shortlisting one or more actions with a high confidence score based on the semantic similarity for facilitating the recommending of at least one probable action to the speaker, the at least one probable action substituting the default actions responded by the ASR.

7. The method of claim 6, further comprising:
   registering the input utterance with associated context into the local database of the device based on a positive-feedback received as a part of the review from the speaker; and
   linking the one or more probable action with the input utterance within the local database based on the positive feedback.

8. The method of claim 7, wherein the updating of the global model further comprises:
   obtaining a posterior probability in respect of a non-performance of the recommended action against the unstructured-utterance and comparing the posterior-probability related to the non-performance with a first pre-defined threshold of the DBN;
   based on the posterior-probability exceeding the pre-defined threshold, initiating training of a global model; and
   retraining the global model at least based on the input utterance and the associated context and instantiating the trained global model with respect to the device.

9. The method of claim 8, wherein the instantiating of the trained global model comprises:
   obtaining a delta by identifying at least one predicted actions from the DBN upon the updating of the global model, wherein the delta defining a difference between predicted actions by the DBN before and after the updating of the global model;
   deleting historical data related to action-utterance from the local database and storing the delta; and
   re-generating a set of utterances-action for the local database based on the updated global model.

10. The method of claim 8, wherein the initiating of the training of the global model comprises initiating the training based on determining at-least one of:
   identifying, if the computed semantic similarity between the one or more probable actions predicted from the DBN and action-utterance pairs in the local exceeds a second pre-defined threshold associated with the DBN; or
   identifying, if the probabilities associated with the one or more probable actions recommended to the speaker differ by minimal extent.

11. The method of claim 8, wherein the retraining of the global model comprises:
   registering the input utterance within the global model by aggregating the input utterance by a semantic similarity aggregator into a repository of global utterances to, the semantic similarity aggregator configured to aggregate utterances globally at-least based on the context.

12. The method of claim 8, wherein the updating of the global model further comprises updating a control setting of the device in respect of further processing of input utterances.

13. The method of claim 12, wherein the identifying of the input utterance as an unstructured utterance comprises:
    identifying an action associated with the text by processing the text by the action resolver device;
    allocating the default action to the input utterance by classifying the input utterance as the unstructured utterance by the action resolver device based on an inability to locate the regular action related to the input utterance; and
    obtaining the input utterance to the DBN for determining the one or more probable actions for substituting the default action by identifying the determined action as the default action by an action-checker device.

14. The method of claim 2, further comprising:
    providing the at least one probable action obtained by the DBN to the at-least one speaker in an order of the posterior probability with respect to each action.

15. An automated assistant operating in a computing-system to adaptively predict non-default actions against unstructured utterances, the system comprising:
    an automatic speech recognition (ASR) device configured to extract voice-features based on receiving an input utterance from at-least one speaker;
    an action resolver device configured to identify the input utterance as an unstructured utterance based on the extracted voice-features and a mapping between the input utterance with one or more default actions as drawn by the ASR;
    a DBN configured to obtain at least one probable action to be performed in response to the unstructured utterance; and
    an action review module configured to receive a review of the recommended at least one probable action from the speaker of the input utterance, receive a negative feedback towards the recommended at least one probable action in response to the input utterance from the speaker during the reviewing and update a global model associated with the DBN based on the negative feedback,
    wherein the negative feedback corresponding to rejection of all of the recommended actions by the speaker and rejection of high recommended actions followed by acceptance of less recommend action by the speaker.

16. The system of claim 15, wherein the DBN is further configured to:
    access a log of previous unstructured utterances and the input utterance from the DBN, each of the utterance defined by a context parameter, identify a set of similar utterance similar to the input utterance, by obtaining a centroid and a similarity parameter for each of the previous unstructured utterance and the input utterance, and
    obtain a plurality of probable actions linked to one or more of the input utterance and the set of similar utterances based on posterior probability computation for each probable action.

17. The system of claim 16, further comprising:
    a voice engine configured to provide at least one probable action obtained by the DBN to the speaker in an order of the posterior probability with respect to each action.

18. The system of claim 17, wherein the action resolver device is further configured to:
    identify absence of a regular-action in response to the input utterance from an action resolver device forming a part of the ASR device, and
    identify the default-action as being mapped with the input utterance from the action resolver device.

19. The system of claim 18, wherein the DBN is further configured to obtain the posterior probability for the predicted action based on the context and the centroid similarity associated with the set.

* * * * *